United States Patent
Ando et al.

(10) Patent No.: US 7,334,036 B2
(45) Date of Patent: Feb. 19, 2008

(54) INFORMATION MANAGEMENT SYSTEM AND A METHOD THEREOF

(75) Inventors: Tsutomu Ando, Yokohama (JP); Shuji Fujino, Ayase (JP)

(73) Assignee: Hitachi, Ltd., Tokyo (JP)

( * ) Notice: Subject to any disclaimer, the term of this patent is extended or adjusted under 35 U.S.C. 154(b) by 242 days.

(21) Appl. No.: 10/912,077

(22) Filed: Aug. 6, 2004

(65) Prior Publication Data
US 2005/0237947 A1 Oct. 27, 2005

(30) Foreign Application Priority Data
Apr. 22, 2004 (JP) .............. 2004-126921

(51) Int. Cl.
*G06F 15/173* (2006.01)
(52) U.S. Cl. .................................. 709/224
(58) Field of Classification Search ............... 709/200, 709/208–211, 217–219, 235, 224; 711/147–153; 707/1, 100
See application file for complete search history.

(56) References Cited

U.S. PATENT DOCUMENTS

| | | | |
|---|---|---|---|
| 5,822,535 A * | 10/1998 | Takase et al. ............... 709/226 |
| 6,516,189 B1 * | 2/2003 | Frangione et al. ........... 455/405 |
| 6,807,580 B2 | 10/2004 | Freeman et al. | |
| 6,892,236 B1 | 5/2005 | Conrad et al. | |
| 6,944,732 B2 * | 9/2005 | Thunquest et al. ......... 711/162 |
| 2004/0088314 A1 * | 5/2004 | Simes ........................ 707/102 |
| 2004/0088393 A1 * | 5/2004 | Bullen et al. ............... 709/223 |
| 2004/0215904 A1 * | 10/2004 | Gopisetty et al. ........... 711/153 |
| 2005/0039085 A1 * | 2/2005 | Takeda et al. ................ 714/57 |
| 2005/0086554 A1 * | 4/2005 | Simes ............................ 714/4 |
| 2005/0119996 A1 * | 6/2005 | Ohata et al. .................... 707/3 |

FOREIGN PATENT DOCUMENTS

JP 2002-366394 12/2002

* cited by examiner

*Primary Examiner*—Glenton B. Burgess
*Assistant Examiner*—Philip S. Scuderi
(74) *Attorney, Agent, or Firm*—Mattingly, Stanger, Malur & Brundidge, P.C.

(57) ABSTRACT

An information management system and method reduces the amount of data generated and transmitted for analysis and observation over a first network. An information management sub-system, includes a manager that analyzes or observes data, which is collected by multiple agents connected therewith through the first network. A sub-manager is connected with the agents via a second network, and manages data for the targets of management (such as, various kinds of information data collected by the agents, programs for collecting/analyzing the collected data, and data of analysis results thereof) in a storage, which is also connected with the second network, and which is used commonly between the sub-manager and the agents.

12 Claims, 25 Drawing Sheets

INFORMATION MANAGEMENT SYSTEM AND A METHOD THEREOF

BACKGROUND OF THE INVENTION

The present invention relates to an information management system and a method thereof, for enabling an integrated management upon information, such as, performance data or the like, which is obtained for the purpose of operation management of a system, and further an information management sub-system for that.

When conducting operation management and/or tuning for a system, which is constructed with plural numbers of computers connected with each other through a network, it is necessary or indispensable to make data collection, continuously, and to make an analysis upon the data collected, periodically. For this reason, in general, a program (i.e., an agent) is operated, always, for making the data collecting upon targets; such as, equipments upon which the management is aimed (for example, a database and/or an operation system, etc.), while conducting services at the same time, thereby conducting the data collection in relation to the condition and/or performance or the like of the said equipments. Also, for the purpose of making an analysis upon data, the information data collected is gathered into a computer other than the agent mentioned above, so as to make an observation upon tendency of the data. For example, Japanese Patent Laying-Open No. 2002-366394 (2002) discloses a method for collecting a normalized logfile, which is managed within the agent, into the manager.

BRIEF SUMMARY OF THE INVENTION

For that reason, with the conventional technology mentioned above, a large amount of information is transmitted from the agent to the manager through the network, and therefore, there is a drawback that it results in an increase of the load upon the network. Also, in particular, with such the method of collecting/managing the log-data, as is disclosed in the Japanese Patent Laying-Open No. 2002-366394 (2002) mentioned above, since the log-file managed within the agent is used, but after being transferred into the manager, once, then a drawback is brought about that data transmission is generated, passing through a wide-area network into the agent; therefore, accompanying with an increase of numbers of the agents, it gives pressure or suppression upon the band area of network, which builds up the system.

Then, according to the present invention, for dissolving such the drawbacks of the convectional art mentioned above, an object thereof is to provide an information management system and an information management method for achieving an integrated management upon the information; such as, performance data, etc., which is obtained by the agent, for example, but without generating such the data transmission giving suppression onto the band area of network building up the system, and further an information management sub-system for that.

Namely, according to the present invention, a sub-manager is disposed between the manager and the agent, so as to build up the structure of sharing or using the information data, in common, between the sub-manager and the agent mentioned above, through storage. Thus, not analyzing the information data after being collected, once, but rather the program is moved to a place where the information data lies, so as to execute analysis and/or observation thereupon, thereby preventing the information data from generating in such large amount thereof, to be transmitted through the network, as well as, escaping the wide-area network from such the suppression upon the band area thereof, due to such the data transmission.

In more details, according to the present invention, for accomplishing the object of the present invention mentioned above, firstly there is provided an information management system, comprising: a network; a first management use computer, being connected with said network, on which a manager operates for managing a target equipment of operation/management in the system; a business use computer, being connected with said network, on which an agent operates for executing collection or analysis of data targeting upon said target equipment of operation/management; and a second management use computer, being connected with said network and also connected with a storage for storing information through a second network, on which a sub-manager operates for managing said agent under control of said manager, wherein said sub-manager shares data stored in said storage, relating to said target equipment of operation/management, in common, between said agent, through said second network.

Also, according to the present invention, in the information management system, as described in the above, preferably, said sub-manager further has a function for managing an area within said storage, and said data to be shared in common by said sub-manager includes at least one of a program for conducting collection or analysis of data targeting upon said target equipment of operation/management, data collected by said program, and analysis data obtained by said program. Or, preferably, said sub-manager further comprises a function for letting said agent to execute the program for conducting the collection and analysis upon the data managed within said storage, or preferably, said manager selects analysis data made by said program, which is stored within said storage by said sub-manager, so as to analyze or observe it, again.

Also, according to the present invention, there is further provided an information management sub-system, comprising: a network; a first management use computer, being connected with said network, on which a manager operates for managing a target equipment of operation/management in a system: a business use computer, being connected with said network, on which an agent operates for executing collection or analysis of data targeting upon said target equipment of operation/management; and a second management use computer, being connected with said network and also connected with a storage for storing information through a second network, on which a sub-manager operates for managing said agent, where in said sub-system is connected to a storage for storing information therein through said second network, and data stored in said storage is shared, in common, through said second network, between said agent.

Further, according to the present invention, in the information management sub-system, as described in the above, preferably, said sub-manager further has a function for managing an area within said storage, and at least one of a program for conducting the collection or analysis of data, data collected by said program, or analysis data obtained by said program within said storage, so as to managing it/them, further, said sub-manager may comprises a function for letting said agent to execute the program for conducting the collection and analysis upon the data managed within said storage.

Additionally, according to the present invention, also for accomplishing the object mentioned above, there is also provided an information management method for managing information in an information management system, having: a network; a first management use computer, being connected with said network; a business use computer, being connected with said network; and a second management use computer, being connected with said network and also connected with a storage for storing information through a second network, the method comprising the following steps of: operating a manager for managing a target equipment of operation/management in the system, on said first management use computer; operating an agent for executing collection or analysis of data targeting upon said target equipment of operation/management, on said business use computer; and operating a sub-manager for managing said agent under control of said manager, on said second management use computer, wherein the data stored in said storage, relating to said target equipment of operation/ management, is shared in common, between said sub-manager and said agent, through said second network.

Also, according to the preset invention, in the information management method, as described in the above, preferably, said data to be shared with in common includes at least one of a program for conducting collection or analysis of data targeting upon said target equipment of operation/management, data collected by said program, and analysis data obtained by said program, and further an instruction may be made from said sub-manager to said agent upon execution of the program, for conducting collection or analysis of said data, which is managed within said storage. Also, according to the present invention, said manager may select analysis data obtained by said program and stored within said storage by said sub-manager, so as to make analyze or observe it, again.

Thus, according to the present invention mentioned above, sharing an enormous amount of information data, in common, including programs for conducting collection or analysis of data targeting upon said target equipment of operation/management, data collected by said program, and analysis data obtained by said program therein, between the sub-manager and the agent through the storage, which is connected to said sub-manager through the second network, enables using of such the enormous amount of information data, but without giving ill influence upon the network, through which the business use computers operate, thereby obtaining an effect that the operating efficiency of the business use computers can be increased. Also, localizing of the band area of the network to be used for transmitting that enormous amount of information data enables to protect an outside network band area from suppression thereupon, therefore it also brings about an advantage that the charges and/or loads upon the amount of use of network, etc., can be reduced.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 1:
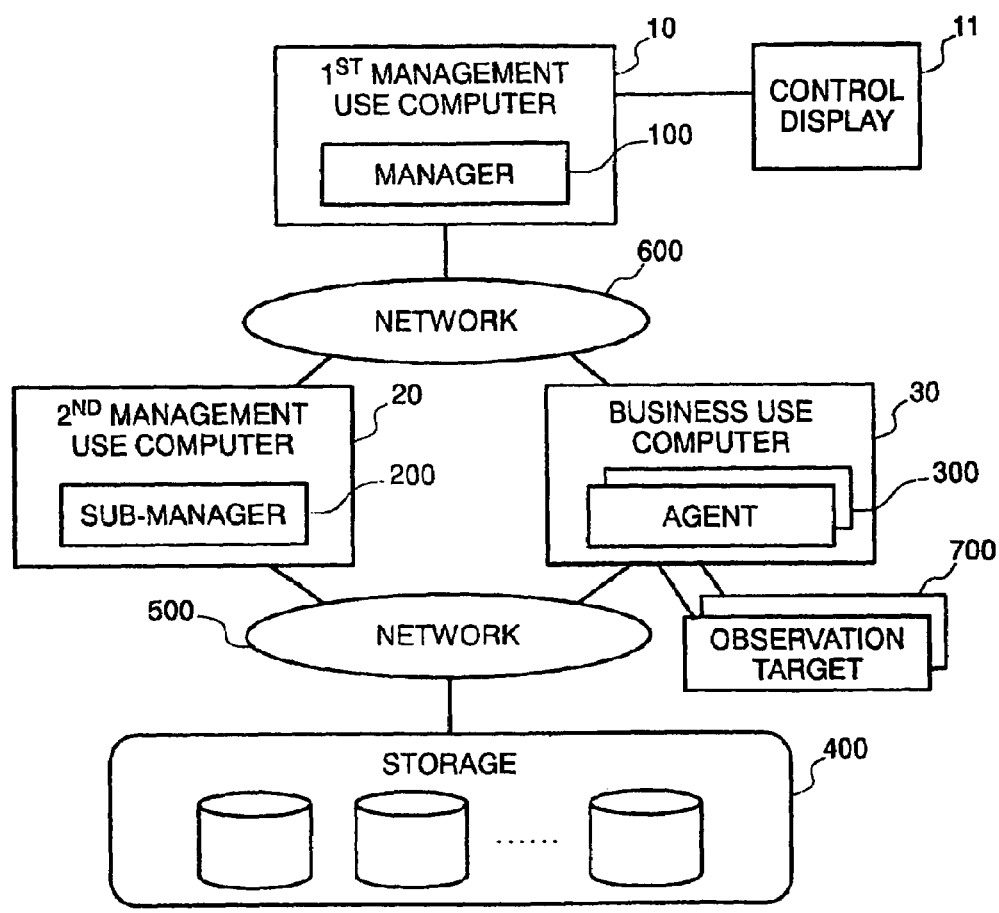
FIG. 1 is a block diagram for showing an example of the entire structure of an operation management system for conducting an automatic distribution of an analysis program, according to one embodiment of the present invention.

First of all, FIG. 1 shows an outlook structure of an operation management system for conducting an automatic distribution of an analysis program, according to one embodiment of the present invention. In the figure, a first computer 10 for us of management (hereinafter, "management use computer"), a second management computer 20, and a computer 30 for use of business (hereinafter, business use computer) are connected with each other, mainly for the purpose of being used in business, through a network 600, such as, LAN and WAN, etc., and wherein a manager 100, a sub-manager 200 and an agent 300 are operating in each thereof, respectively.

Further, in such the operation management system mentioned above, the manager 100 building up the first management use computer 10 consists of an application program(s), which is/are stored in a main memory device of the computer and is running under an operating system (hereinafter, "OS"). Also, with the first management use computer 10 is connected a control display 11; therefore various kinds of controls can be executed from this control display 11. For example, with this, it is possible to manage plural numbers of sub-managers 200, which are connected to the network 600, directly. However, in a case where the sub-manager 200, as a target of management, is only one (1) in the number thereof, it is also possible to make the manager 100 operating on the second management use computer 20, being same to the said sub-manager 200.

On the other hand, plural numbers of the agents 300, each of which also consists of an application program(s) running under the OS stored in the main memory device of the computer, and one (1) or more of them is/are executed in the said business user computer 30. Also, each the agent 300 has so-called observation target(s) 700, such as, the programs and/or "OS"s, etc., for example, which are managed by each.

Also, the management use computer 20, on which the bus-manager 200 operates, and the business use computer 30, on which the agent(s) 300 operates, they are connected with each other, through a SAN (Storage Area Network), etc., for example, mainly for conducting communication of data therethrough, but separating from the network 600 mentioned above. Further, with this network 500 is/are connected one (1) or more of the storages 400, which are accessible from the sub-manager(s) 200 and the agent(s) 300 mentioned above.

Figure 2:
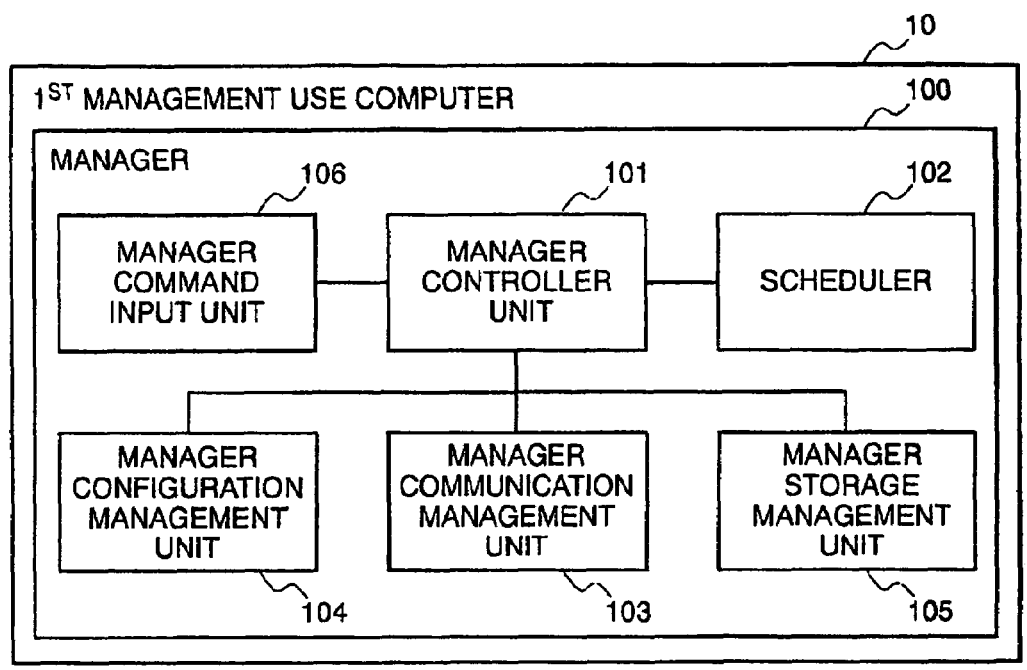
FIG. 2 is a function block diagram for showing the structure of a manager, in the operation management system shown in FIG. 1 mentioned above.

Next, FIG. 2 is the function block diagram for showing the structure of the manager 100 mentioned above, and hereinafter, explanation will be given about an outlook of an each of function modules, which build up that manager 100.

(1) Manager Controller Unit 101

This is a program for controlling other function blocks within the same manager, and it also makes an instruction and/or a response between the sub-manager 200.

(2) Scheduler 102

This is a program, while managing job schedules within the sub-manager 200 and the agent 300, forgiving a notice to the manager controller unit 101 mentioned above, at a specific time, so as to execute or stop a specific process.

(3) Manager Communication Management Unit 103

This is a program for conducting communication control, when the manager 100 makes a communication through the network 600.

(4) Manager Configuration Management Unit 104

This is a program for managing a list of information about the sub-manager(s) 200 and the agent(s) 300, and also the data and the program(s) to be dealt with by them.

(5) Manager Storage Management Unit 105

This is a program for managing a storage area where the manager 100 uses, when the manager 100 can make an access onto the storage 400 through the network 500, directly, and this manages a relationship, such as, between a partition on the storage 400 and a file path thereof on the storage 400, which is used by a collection/analysis program and so on, for example.

(6) Manager Command Input Unit 106

This is a program for accepting a command coming to the manager from an outside, and a command for controlling the sub-manager(s) 200 and/or the agent(s) 300 under the management of the said manager 100.

Figure 3:
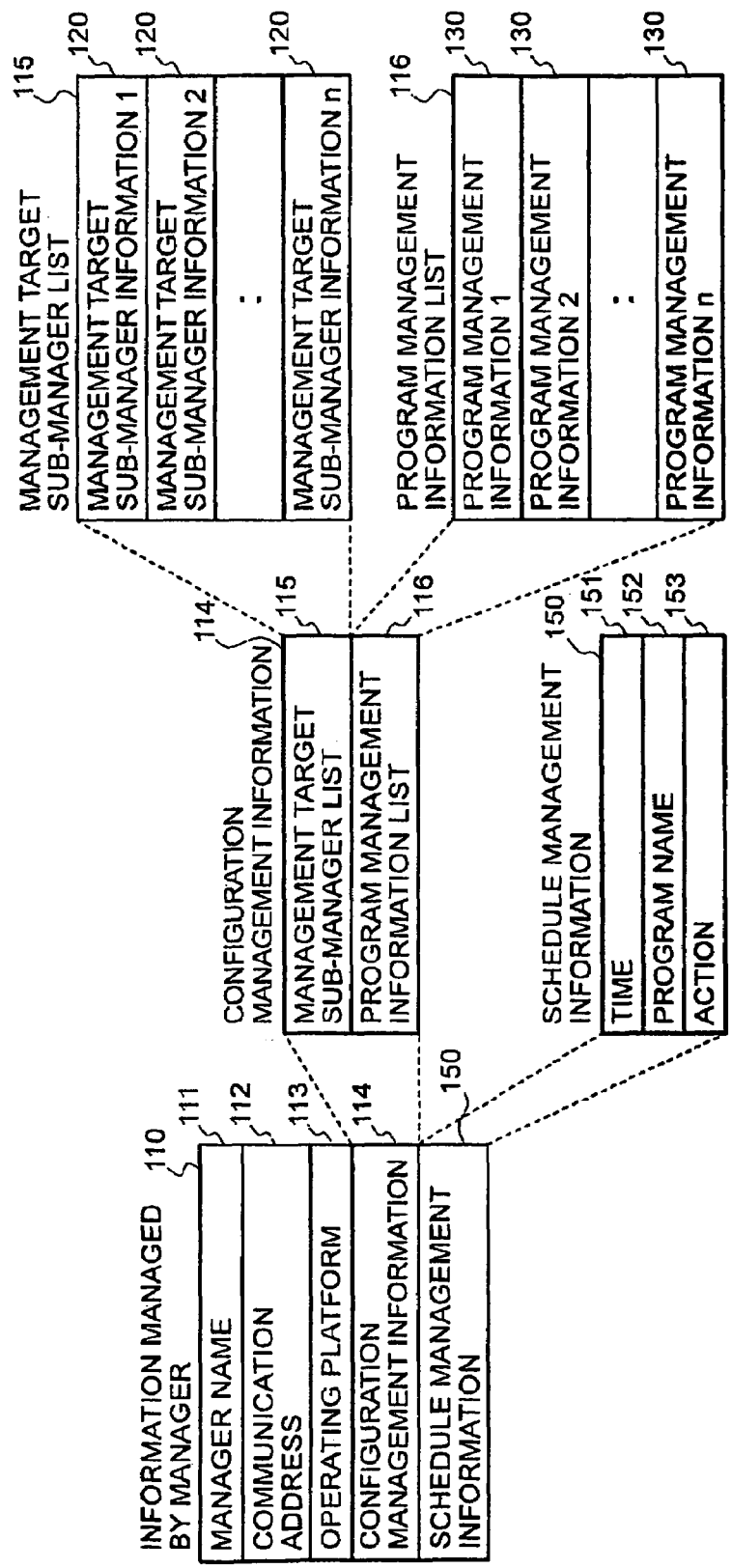
FIG. 3 is a view for showing an outlook of information, which is managed within the manager.

Next, FIG. 3 is an outlook view of the information, which is managed within the manager 100 mentioned above. Namely, this "INFORMATION MANAGED BY MANAGER" 110 includes: "MANAGER NAME" 111, "COMMUNICATION ADDRESS" 112, "OPERATING PLATFORM" 113, "CONFIGURE MANAGEMENT INFORMATION" 114, and "SCHEDULE MANAGEMENT INFORMATION" 150. Further, herein, the "MANAGER NAME" 111 is a unique name or title for identifying the manager 100 mentioned above. Also, the "COMMUNICATION ADDRESS" 112 is the information, such as, an IP address and/or a port number, etc., for example. The "OPERATING PLATFORM" 113 is the information relating to the platform, on which the manager 100 operates, but further about the "CONFIGURE MANAGEMENT INFORMATION" 114 and the "SCHEDULE MANAGEMENT INFORMATION" 150 thereof, explanation will be given below.

Namely, the "CONFIGURE MANAGEMENT INFORMATION" 114 consists of "MANAGEMENT TARGET SUB-MANAGER LIST" 115 for managing the information of the sub-manager under the control thereof, and "PROGRAM MANAGEMENT INFORMATION LIST" 116 for managing the program information to be executed within the sub-manager(s) 200 and the agent(s) 300.

Further, within the "MANAGEMENT TARGET SUB-MANAGER LIST" 115 building up the "CONFIGURE MANAGEMENT INFORMATION" 114 mentioned above, there is held so-called "MANAGEMENT TARGET SUB- MANAGER INFORMATION 1–n" 120: i.e., the information relating to the sub-manager(s) 200 under the control thereof, in the form of a list. Also, within the "PROGRAM MANAGEMENT INFORMATION LIST" 116 mentioned above, there is held the information relating to the programs under the control thereof, i.e., "PROGRAM MANAGEMENT INFORMATION 1-n" 130, in the form of a list, too.

Figure 4:
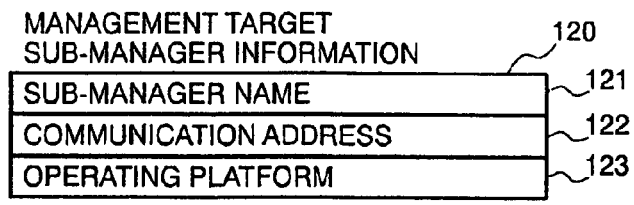
FIG. 4 is a view for showing the information managed within the manager shown in FIG. 3, and in particular, the details management target sub-manager information.

FIG. 4 shows the details of the "MANAGEMENT TARGET SUB-MANAGER INFORMATION 1-n" 120, each of them consists of "SUB-MANAGER NAME" 121, "COMMUNICATION ADDRESS" 122 and "OPERATING PLATFORM" 123, respectively.

Figure 5:
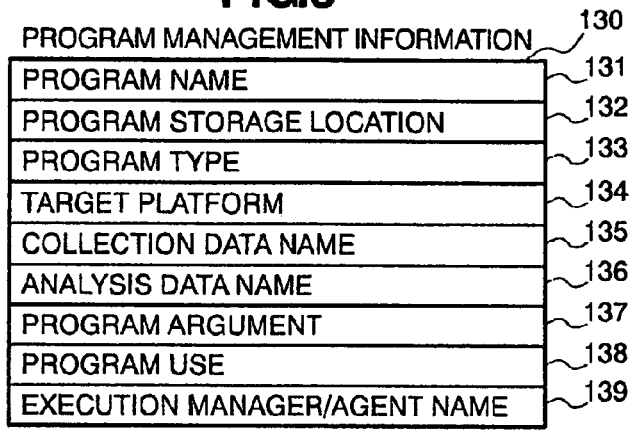
FIG. 5 is a view for showing the information managed within the manager shown in FIG. 3, and in particular, the details program management information.

Also, FIG. 5 shows the details of the "PROGRAM MANAGEMENT INFORMATION 1-n" 130. Thus, each of the program management information 130 consists of "PROGRAM MANE" 131, "PROGRAM STORAGE LOCATION" 132, "PROGRAM TYPE" 133, "TARGET PLATFORM" 134, "COLLECTION DATA NAME" 135 and "ANALYSIS DATA NAME" 136. "PROGRAM ARGUMENT" 137, "PROGRAM USE" 138, and "EXECUTION MANAGER/AGENT NAME" 139, respectively. Herein, the "PROGRAM MANE" 131 is a unique name or title for identifying the program, the "PROGRAM STORAGE LOCATION" 132 a path name indicative of a storage location of the program, the "PROGRAM TYPE" 133 indicative of whether for use of analysis or collection, the "TARGET PLATFORM" 134 indicative of platform information, on which the program can be executed, which is the identification information for indicating a kind (for example, the program or the "OS", etc.) of the observation target 700, if being for use of collection, the "COLLECTION DATA NAME" 135 and "ANALYSIS DATA NAME" 136 unique names or titles for identifying the location where the collection data is store or the location where the analysis data is stored, respectively (however, in the case when the program type 133 is indicative of the collection program, the column of the said analysis data name 136 is empty or opened), the "PROGRAM ARGUMENT" 137 a command line argument when executing the program, the "PROGRAM USE" 138 indicative of way of use of the program, and the "EXECUTION MANAGER/AGENT NAME" 139 indicative of a name or title of the sub-manager 200 or the agent 300, which executes the program (however, in the case where there is no need to designate exactly the name or title of the sub-manager 200 or the agent 300, necessarily, the description can be made with targeting plural numbers of the agents 300, through designation of such as, a wildcard, or a regular expression, etc., for example).

Again, turning back to FIG. 3 mentioned above, in this figure is shown the details of the "SCHEDULE MANAGEMENT INFORMATION" 150 building up the "INFORMATION MANAGED BY MANAGER" 110 mentioned above. In more details thereof, it consists of "TIME" 151, "PROGRAM NAME" 152 and "ACTION" 153. Herein further, the "TIME" 151 is a unique expression of time independent upon an area, on which the event will occur corresponding to the "PROGRAM NAME" 152 and the "ACTION" 153. Also, the "PROGRAM NAME" 152 is a name or title of the program to be executed or stopped, and the "ACTION" 153 is information for indicating the execution or stoppage thereof.

Figure 6:
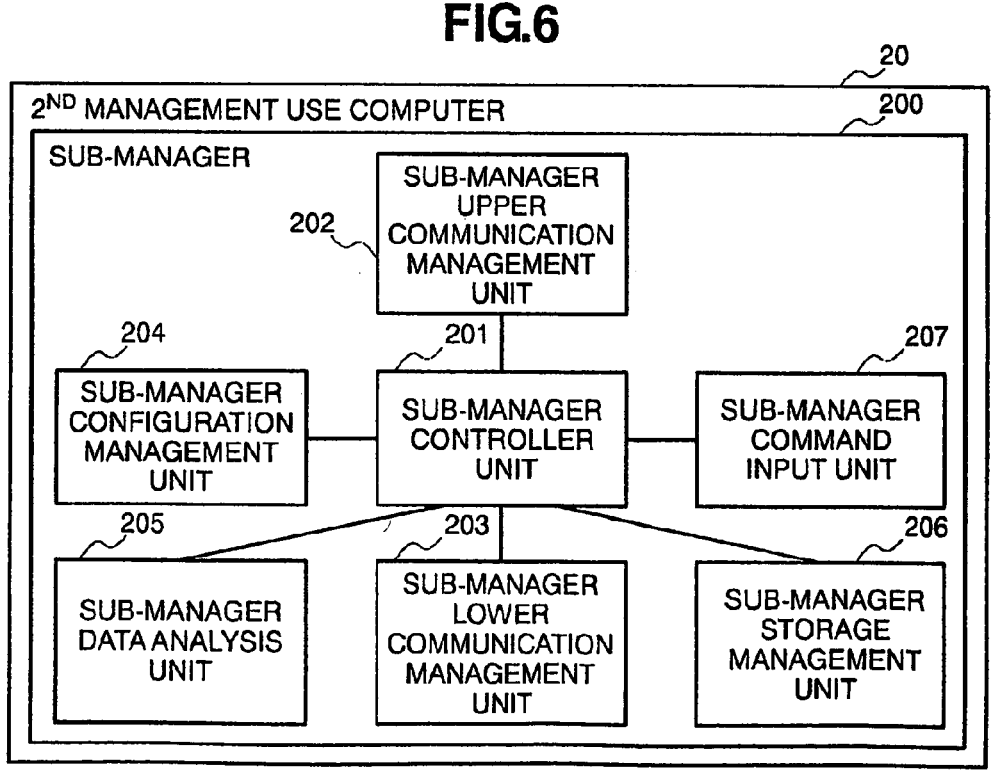
FIG. 6 is a function block diagram for showing the structure of a sub-manager, in the operation management system shown in FIG. 1 mentioned above.

Next, FIG. 6 is the function block diagram for showing the structure of the sub-manager 200 mentioned above, and hereinafter, explanation will be made on an each function module of building up the said sub-manager 200.

(1) Sub-manager Controller Unit 201
This is a program for controlling other function blocks within the same sub-manager; i.e. receiving an instruction from an upper manager thereof, that is, the manager 100, it makes communication between the agent 300, and depending upon necessity, it turns back a response thereto.

(2) Sub-manager Upper Communication Management Unit 202
This is a program for conducting communication control when the communication is conducted through the network 600, being made of the LAN, or the WAN, etc.

(3) Sub-manager Lower Communication Management Unit 203
This is a program to be used when making the communication through the network 500 mentioned above, and it also can make the communication control between the storage network 400.

(4) Sub-manager Configuration Management Unit 204
This is a program for managing a series of so-called configuration management information, including information of the said sub-manager itself, information of the agent (s) 300 under the control thereof, information of the upper manager 100, the program management information, and the storage management information, etc.

(5) Sub-manager Data Analysis Unit 205
This is a program for analyzing the collection information, which is collected by the agent(s) 300 under the control of the said sub-manager 200, with an aid of the program designated by the manager 100.

(6) Sub-manager Storage Management Unit 206
This is a program to be used by said sub-manager 200 and the agent(s) 300 under the control thereof, for making management upon the storage area, and in particular, for managing the relationship between the partition and the file path on the storage 400, to be used for the collection/analysis data, the collection/analysis program, etc.

(7) Sub-manager Command Input Unit 207
This is a program for receiving a command coming to the said sub-manager 200 from an outside thereof, and also a command for the purpose of controlling the agent(s) 300 under the control of the said sub-manager 200.

Figure 7:
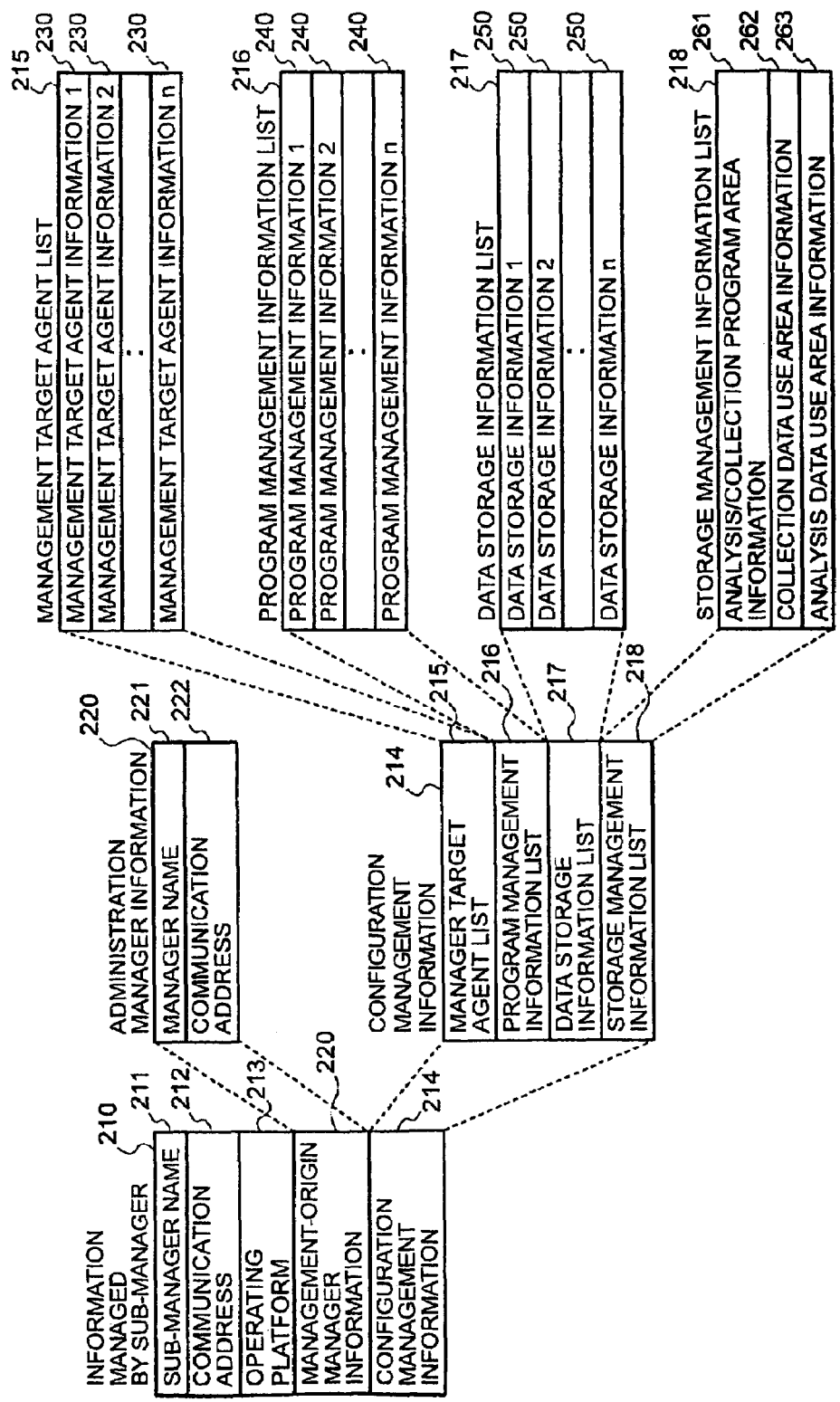
FIG. 7 is a view for showing an outlook of information, which is managed within the sub-manager.

Following to the above, FIG. 7 shows an outlook of the information, which is managed within the sub-manager 200 mentioned above. Thus, "INFORMATION MANAGED BY SUB-MANAGER" 210 consists of "SUB-MANAGER NAME" 211, "COMMUNICATION ADDRESS" 212, "OPERATING PLATFORM" 213, "ADMINISTRATION MANAGER INFORMATION" 220, and "CONFIGURATION MANAGEMENT INFORMATION" 214. Herein, the "SUB-MANAGER NAME" 211 is a unique name or title for identifying the sub-manager 200 mentioned above, the "COMMUNICATION ADDRESS" 212 the information, such as, the IP address and/or port number, etc., and the "OPERATING PLATFORM" 213 the information of the platform, on which the sub-manager 200 operates, however about the "ADMINISTRATION MANAGER INFORMATION" 220 and the "CONFIGURATION MANAGEMENT INFORMATION" 214, detailed explanation will be given below.

Namely, the "ADMINISTRATION MANAGER INFORMATION" 220 consists of "MANAGER NAME" 221 and "COMMUNICATION ADDRESS" 222, as shown in the middle portion of the figure. Also, the "CONFIGURATION MANAGEMENT INFORMATION" 214 consists of "MANAGEMENT TARGET AGENT LIST" 215 for managing the information of the agent(s) 300 under the control thereof, "PROGRAM MANAGEMENT INFORMATION LIST" 216 for managing the information of the programs to be executed by the sub-manager(s) 200 and the agent(s) 300, "DATA STORAGE INFORMATION LIST" 217 for managing the data name and the location thereof, and "STORAGE MANAGEMENT INFORMATION" 218 for achieving partition management of a management use storage 406 of the storage 400.

Further, on the right-hand side of FIG. 7, there are shown the details of the "MANAGEMENT TARGET AGENT LIST" 215, the "PROGRAM MANAGEMENT INFORMATION LIST" 216, the "DATA STORAGE INFORMATION LIST" 217 and the "STORAGE MANAGEMENT INFORMATION" 218, which build up the "CONFIGURATION MANAGEMENT INFORMATION" 214 mentioned above.

Figure 8:
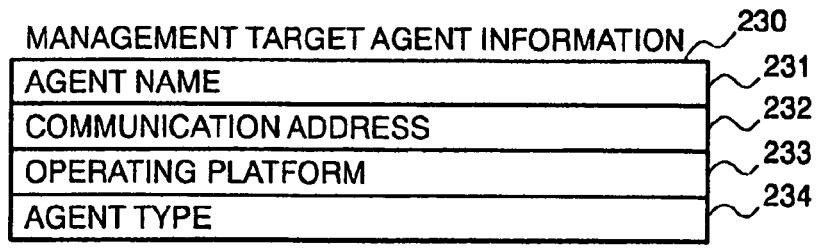
FIG. 8 is a view for showing the details of, in particular, management target agent information shown in FIG. 7 mentioned above.

Namely, within the "MANAGEMENT TARGET AGENT LIST" 215, there are held the information relating to the agent(s) 300 under the control thereof; i.e., "MANAGEMENT TARGET AGENT INFORMATION 1–n" 230, respectively, in the form of the list thereof. Further, the details of the "MANAGEMENT TARGET AGENT INFORMATION 1–n" 230 are shown in FIG. 8, and each of them consists of "AGENT NAME" 231, "COMMUNICATION ADDRESS" 232, "OPERATING PLATFORM" 233, and "AGENT TYPE" 234 for indicating the type of the observation target.

Figure 9:
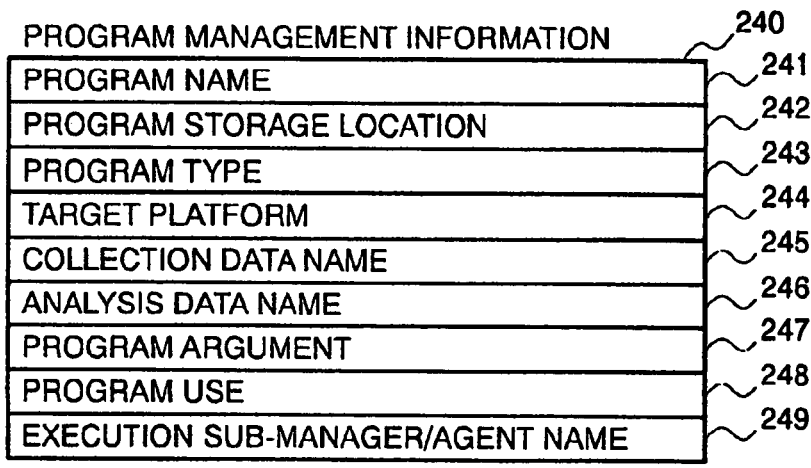
FIG. 9 is a view for showing the details of, in particular, program management information shown in FIG. 7 mentioned above.

Also, within the "PROGRAM MANAGEMENT INFORMATION LIST" 216, there are held lists of "PROGRAM MANAGEMENT INFORMATION 1–n" 240, i.e., the details of the program management information, respectively. Further, details of the "PROGRAM MANAGEMENT INFORMATION 1–n" 240 are shown in FIG. 9, wherein each of them consists of "PROGRAM NAME" 241, being a unique name for identifying the program, "PROGRAM STORAGE LOCATION" 242, being a path name for indicating the storage location of the program, "PROGRAM TYPE" 243, indicative of whether for use of analysis or collection, and if it is for use of collection, an identification information indicating of which kind the observation target 700 is (for example, the program or the "OS", etc.), "TARGET PLATFORM" 244 indicating the platform information, on which the program can be executed, "COLLECTION DATA NAME" 245 and "ANALYSIS DATA NAME" 246, each being a unique name for identifying the collection data storage location and the analysis data storage location, respectively, (however, in the case where the program type 243 indicates the collection program, the column of the said analysis data name 246 is empty or opened), "PROGRAM ARGUMENT" 247 being a command line argument when executing the program, "PROGRAM USE" 248 indicative of the way of use of the program, and "EXECUTION SUB-MANAGER/AGENT NAME" 249 indicating the name or title of the sub-manager 200 or the agent 300, which executes the program.

Figure 10:
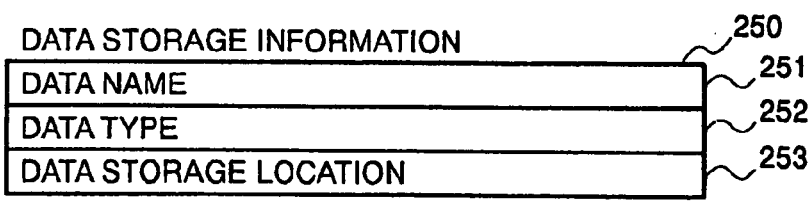
FIG. 10 is a view for showing the details of, in particular, data storage information shown in FIG. 7 mentioned above.

Further, within the "DATA STORAGE INFORMATION LIST" 217 are held "DATA STORAGE INFORMATION 1-n" 250, being the information relating to the data under the control thereof, in the form of a list, and each "DATA STORAGE INFORMATION" 250 consists of, as shown in FIG. 10, "DATA NAME" 251 being a unique name for identifying each data, "DATA TYPE" 252, being identification information of indicating on either one of the collection data or the analysis data, "DATA STORAGE LOCATION" 253 being a path name for indicating the data storage location on the storage 400.

And, within the "STORAGE MANAGEMENT INFORMATION" 218, as is shown in FIG. 7 mentioned above, three (3) information, such as, "ANALYSIS/COLLECTION PROGRAM AREA INFORMATION" 261, "COLLECTION DATA AREA INFORMATION" 262 and "ANALYSIS DATA AREA INFORMATION" 263 are managed therein, according to the way of use of the management use storage 416 of the storage 400.

Figure 11:
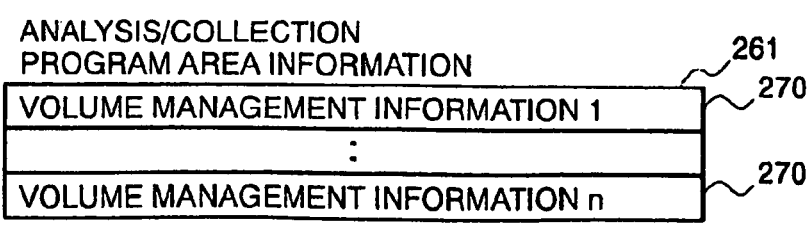
FIG. 11 is a view for showing the details of, in particular, area information for use of collection/analysis program shown in FIG. 7 mentioned above.
Figure 12:
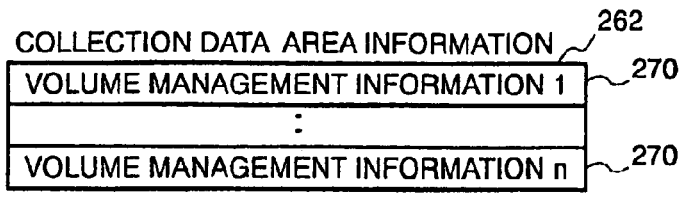
FIG. 12 is a view for showing the details of, in particular, area information for use of collection data shown in FIG. 7 mentioned above.
Figure 13:
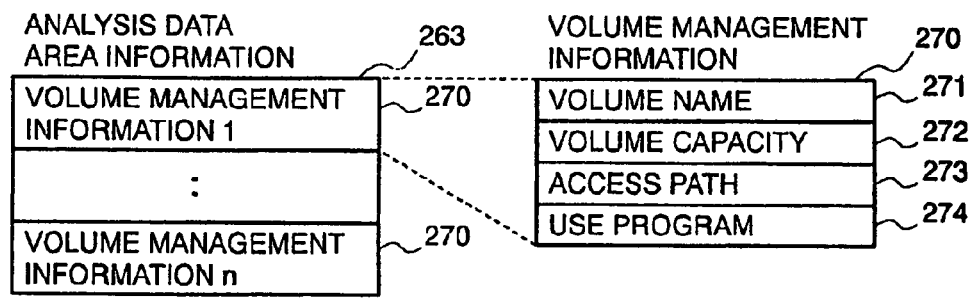
FIG. 13 is a view for showing the details of, in particular, area information for use of analysis data shown in FIG. 7 mentioned above.

Namely, those "ANALYSIS/COLLECTION PROGRAM AREA INFORMATION" 261, "COLLECTION DATA AREA INFORMATION" 262 and "ANALYSIS DATA AREA INFORMATION" 263 are, as shown in FIGS. 11, 12 and 13, information, each holding plural numbers of volume management information 270 therein, in the form of a list, respectively. And, the "ANALYSIS/COLLECTION PROGRAM AREA INFORMATION" 261 manages the volume information of the collection/analysis program, the "COLLECTION DATA AREA INFORMATION" 262 the volume information of the collection data, and the "ANALYSIS DATA AREA INFORMATION" 263 the volume information of the analysis data, respectively. And, in particular, on the right-hand side of FIG. 13, there is shown the details of the volume management information 270, wherein each of those volume management information consists of, for example, "VOLUME NAME" 271 being a unique name for identifying the volume, "VOLUME CAPACITY" 272 indicating a size assigned when producing the volumes, "ACCESS PATH" 273 being a path name corresponding to the volume, and "USING PROGRAM" 274 including the "PROGRAM NAME" 241 of the program(s) that is/are using the same volume, as we as a list of information of the agent(s) 300 and the sub-manager(s) 200 that are executed. Herein, for example, in a case where the program having the "PROGRAM NAME" 241 of "Program1" refers the volume having the "VOLUME NAME" 271 of "Volume1" from each of the agents 300 having the "AGENT NAME" 311 of "Agent 1" and "Agent 2", then "Program1@Agent1, Program1@Agent2" is described in the "USING PROGRAM" 274 of the "VOLUME MANAGEMENT INFORMATION" 270 corresponding thereto.

Figure 14:
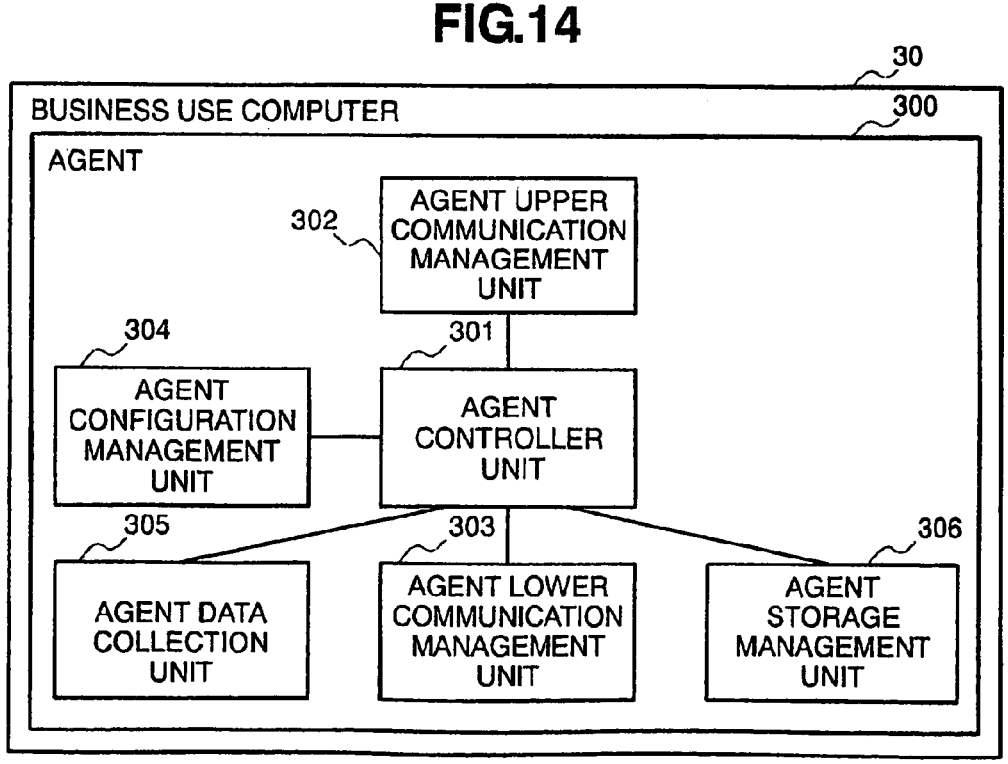
FIG. 14 is a function block diagram for showing the structure of an agent, in the operation management system shown in FIG. 1 mentioned above.

Further, FIG. 14 is the function block diagram for showing the structure of the each agent 300, and hereinafter, explanation will be made about an outlook of the function modules of each, building up the each agent 300.

(1) Agent Controller Unit 301

This is a program for controlling other function programs within the same agent, and also receives an instruction from the sub-manager 200 mentioned above and turns back a response thereto.

(2) Agent Upper Communication Management Unit 302

This is a program for conducting the communication control when conducting the communication through the network 600, being made of the LAN or the WAN, etc.

(3) Agent Lower Communication Management Unit 303

This is a program to be used when communicating through the network 500 mentioned above, and in particular, is also able to make the communication control between the storage network.

(4) Agent Configuration Management Unit 304

This is a program for managing the information of the agent itself, the information of the upper sub-manager 200, and also the information of the collection program, which is designated from the upper sub-manager.

(5) Agent Data Collection Unit 305

This is a program for collecting performance information or the like of the observation targets of each the agent.

(6) Agent Storage Management Unit 306

This is a program for managing the relationship between the partition and the file path on the storage 400 mentioned above, in relation to the storage areas and the programs for the collection data, which are designated from the sub-manager 200.

Figure 15:
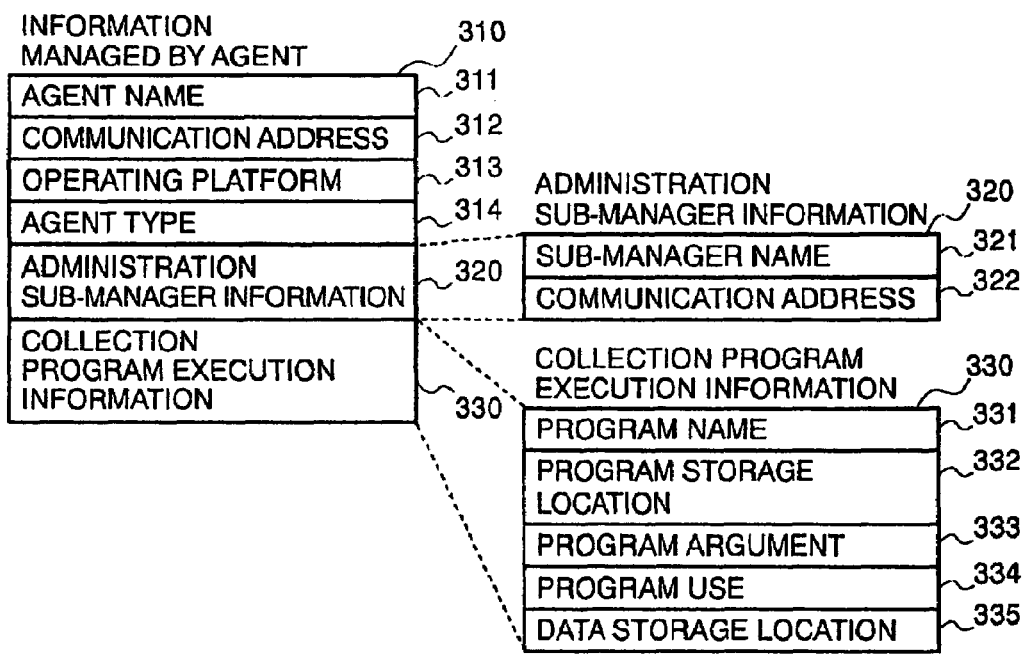
FIG. 15 is a view for showing an outlook of information, which is managed within the agent.

Next, FIG. 15 shows an outlook of the information, which is managed within the agent 300 mentioned above. Namely, each "INFORMATION MANAGED BY AGENT" 310 consists of "AGENT NAME" 311, "COMMUNICATION ADDRESS" 312. "OPERATING PLATFORM" 313. "AGENT TYPE" 314, "ADMINISTRATION SUB-MANAGER INFORMATION" 320, and "COLLECTION PROGRAM EXECUTION INFORMATION" 330. Further, the "AGENT NAME" 311 is a unique name or title for identifying the agent 300, and the "COMMUNICATION ADDRESS" 312 the information, such as, the IP address and/or the port number, etc. Also, the "OPERATING PLATFORM" 313 is the information of the platform, on which the agent(s) 300 operates, and the "AGENT TYPE" 314 the Information for indicating for which the agent 300 is. And, the "ADMINISTRATION SUB-MANAGER INFORMATION" 320, and the "COLLECTION PROGRAM EXECUTION INFORMATION" 330 will be explained below.

Namely, the "ADMINISTRATION SUB-MANAGER INFORMATION" 320 consists of, as shown on the right-hand side of FIG. 15, "SUB-MANAGER NAME" 321 and "COMMUNICATION ADDRESS" 322. Also, the "COLLECTION PROGRAM EXECUTION INFORMATION" 330 consists of "PROGRAM NAME" 331, being a unique name for identifying the collection program, "PROGRAM STORAGE LOCATION" 332 being a path name indicative of the storage location of the program on the storage, "PROGRAM ARGUMENT" 333 being parameter when executing the collection program, "PROGRAM USE" 334 explaining the way of use of the collection program, and "DATA STORAGE LOCATION" 335 being a path name indicative of the data storage location on the storage 400, where the collection data is stored. Further, it is possible to contain the information equal to the "DATA STORAGE LOCATION" 335 mentioned above in the "PROGRAM ARGUMENT" 333.

Figure 16:
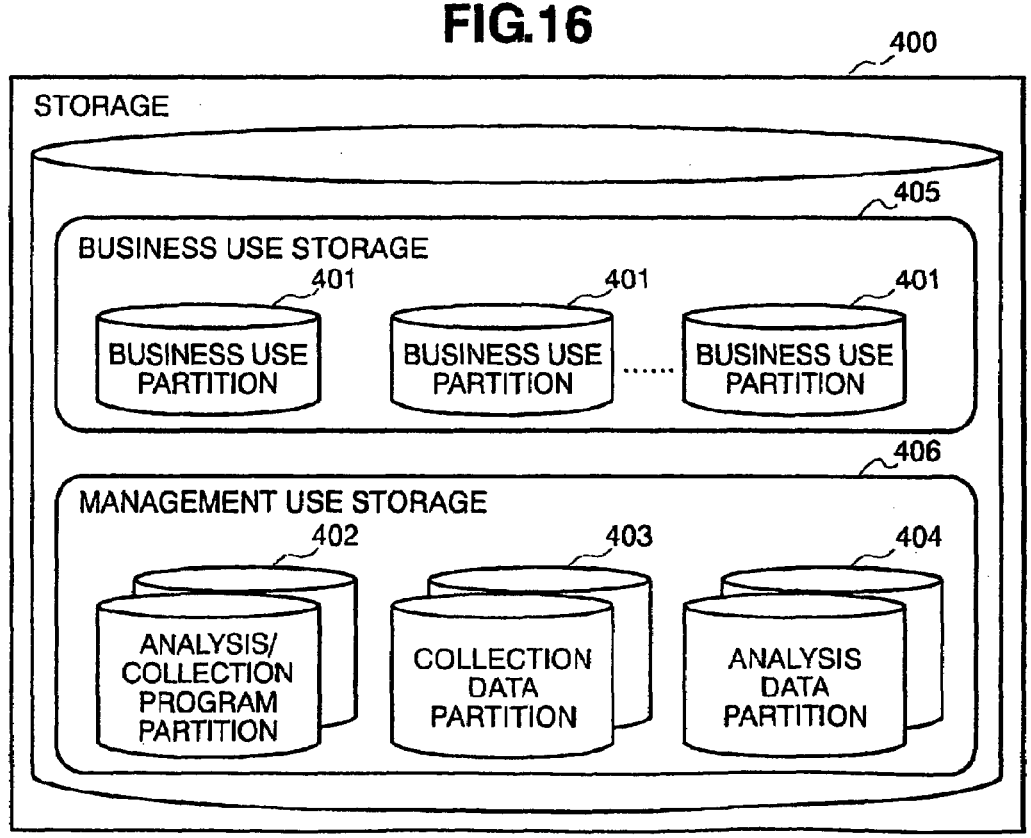
FIG. 16 is a view for showing the logical structure of storage, in the operation management system shown in FIG. 1 mentioned above.

Further, in FIG. 16 is a view for showing the logical structure of the storage 400 mentioned above, and hereinafter, explanation will be given about an outlook of each of portions building up the storage 400. However, a word "partition" indicates either a physical or a logical volume, which will be used hereinafter.

(1) Business Use Partition 401

This is a partition to be used for the purpose of business.

(2) Analysis/Collection Program Partition 402

This is a partition, which is constructed with one (1) or more of the areas, for storing the analysis program, the collection program, or both of those therein.

(3) Collection Data Partition 403

This is a partition, which is constructed with one (1) or more of the areas, for piling up therein the performance data or the like, which the collection program of the agent 300 collects.

(4) Analysis Data Partition 404

This is a partition, which is constructed with one (1) or more of areas, for the analysis program of the each the sub-manager 200 or the agent 300 to store the analysis results therein.

(5) Business Use Storage 405

This is storage for use of business, which is constructed with one (1) or more of business use partition 401.

(6) Management Use Storage 406

This is storage, which is constructed with the analysis/collection program partition 402, the collection data partition 403 and the analysis data partition 404 mentioned above.

Hereinafter, details will be explained about the operation of the manager 100, the sub-manager 200, and each of the agents 300, respectively, but including the storage 400 therein.

Figure 17:
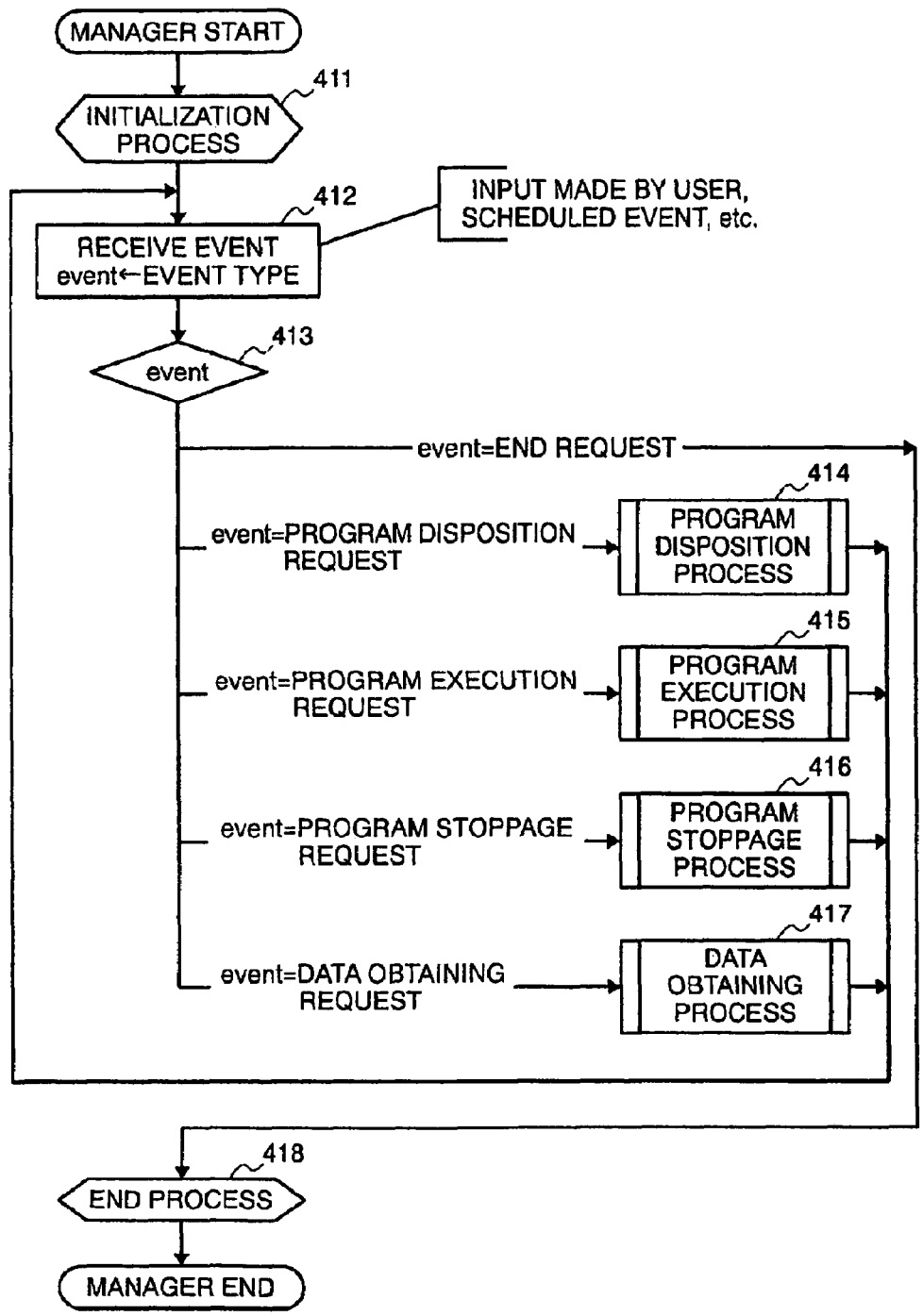
FIG. 17 is a flowchart for explaining the contents of event processing in the manager.

First, FIG. 17 is a flowchart for showing an outlook of event processing in the manager 100 mentioned above. Namely, in this event processing, after an initialization process (411), the manager 100 enters into a loop for waiting an event, while blocking until arrival of the next event (412); such as, an input from a user and/or a scheduled event, etc., for example. And, when the next event arrives, a check is made upon the contents of that event (413), and thereafter, a process is conducted depending upon the contents of the event arriving thereto. Further, as that event, there can be included "END REQUEST", "PROGRAM DISPOSITION REQUEST", "PROGRAM EXECUTION REQUEST", "PROGRAM STOPPAGE REQUEST", and "DATA OBTAINING REQUEST".

When receiving the "END REQUEST", the manager 100 comes out from the event-waiting loop, so as to conduct an end process (418), and thereby completing the process. On the other hand, when receiving any one of those "PROGRAM DISPOSITION REQUEST", "PROGRAM EXECUTION REQUEST", "PROGRAM STOPPAGE REQUEST", and "DATA OBTAINING REQUEST", the manager 100 conducts "PROGRAM DISPOSITION PROCESS" (414), "PROGRAM EXECUTION PROCESS" (415), "PROGRAM STOPPAGE PROCESS" (416), or "DATA OBTAINING PROCESS" (417), respectively, and thereafter, the process returns to the event receipt step 412 mentioned above.

Figure 18:
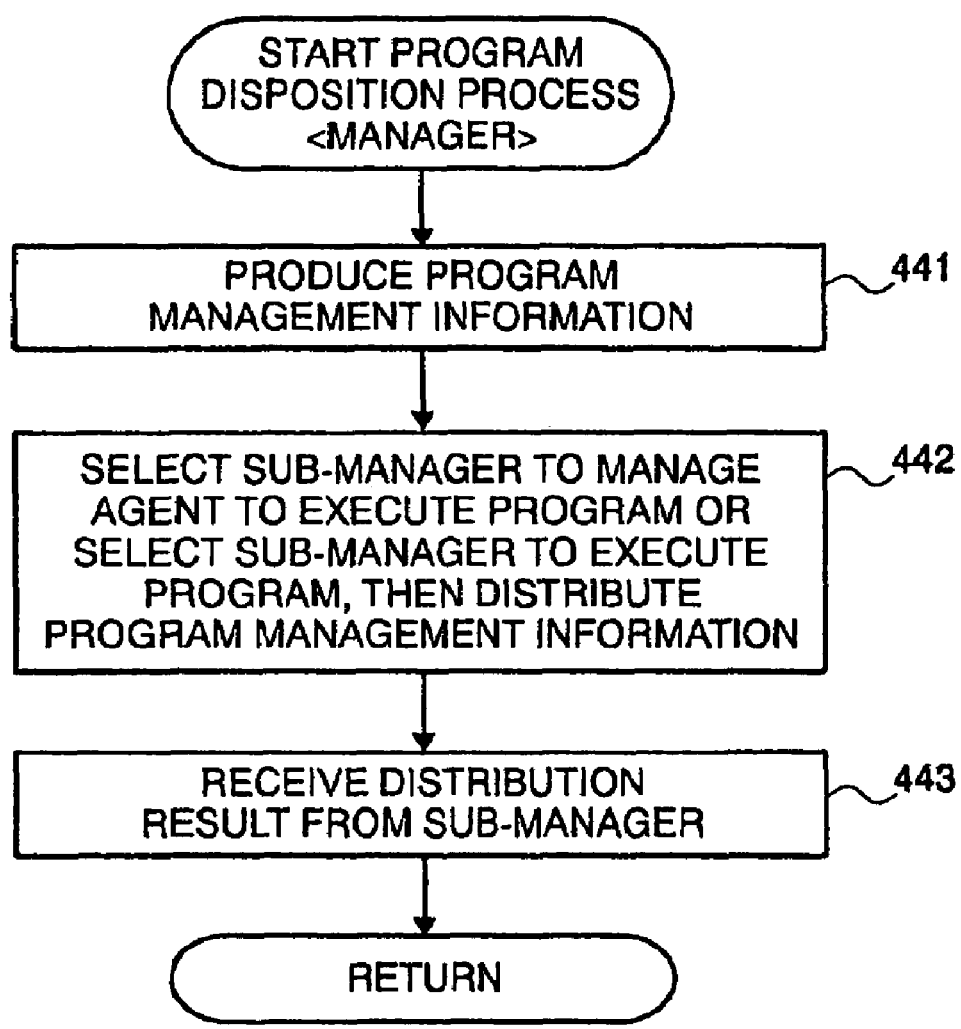
FIG. 18 is a flowchart for explaining the contents of program disposition process, in the event processing of the manager shown in FIG. 17 mentioned above.

FIG. 18 is a flowchart for showing an outlook the "PROGRAM DISPOSITION PROCESS" (414) in the manager 100 mentioned above. Namely, in this program disposition process, the manager 100 produces the "PROGRAM MANAGEMENT INFORMATION" 130 (see FIG. 5) to be disposed into the sub-manager 200 (441), upon the basis of the request, and sends it to the sub-manager 200 together with an actual program (442). In that instance, the addressee is determined depending upon the fact, on which one of the sub-managers 200 or the agents 300 the said program is executed. For example, regarding the program to be executed on the sub-manager 200, the said sub-manager 200 is determined upon the basis of the "CONFIGURATION MANAGEMENT INFORMATION" 114. On the other hand, regarding the program to be executed on the agent 300, the agent 300 corresponding thereto is determined upon the basis of the "CONFIGURATION MANAGEMENT INFORMATION" 114 mentioned above and the "CONFIGURATION MANAGEMENT INFORMATION" 214 (see FIG. 7), which is managed by the sub-manager 200 mentioned above. Further, this "CONFIGURATION MANAGEMENT INFORMATION" 214 is obtained through an inquiry to the sub-manager 200. Thereafter, receiving a distribution result from the sub-manager 200 (443), the process turns back to the previous process.

Figure 19:
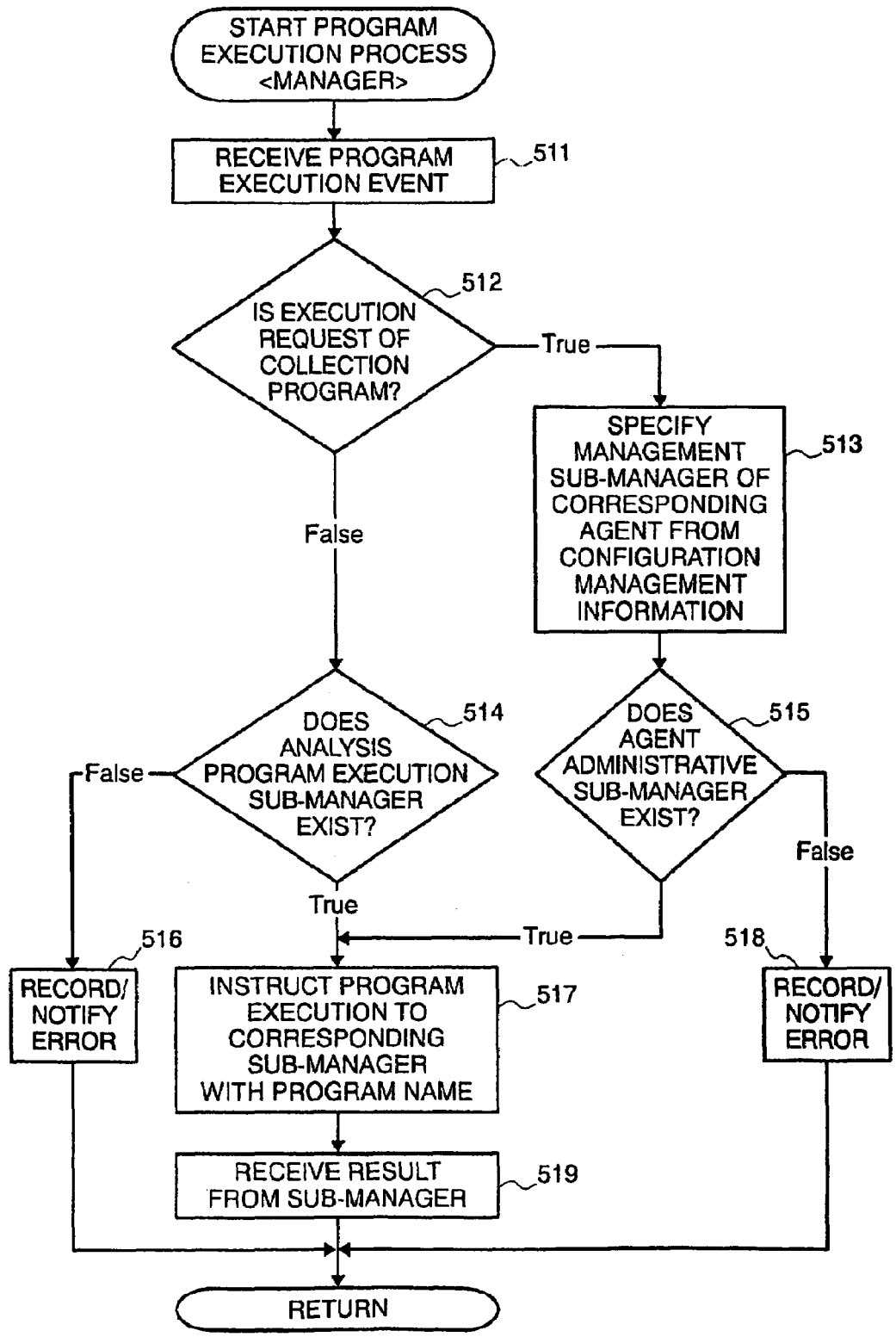
FIG. 19 is a flowchart for explaining the contents of program execution process, in the event processing of the manager shown in FIG. 17 mentioned above.

FIG. 19 is a flowchart for showing an outlook of "PROGRAM EXECUTION PROCESS" (415) in the manager 100 mentioned above. In this process, the manager 100 receives a program execution even (511), indicating an execution of the program, from the scheduler 102 or the manager command input unit 106. Next, for identifying the sub-manager 200 to instruct the execution of the program, determination is made upon the type of the program (512).

Namely, determination is made on whether the execution program is the collection program or not. As a result thereof, in the case where the execution program is the collection program (i.e., "True" in the figure), the manager 100 will identify the administrative sub-manager 200 of the corresponding agent based on the "CONFIGURATION MANAGEMENT INFORMATION" 114 mentioned above (513), thereby confirming the existence of the administration sub-manager 200 (515). On the other hand, in the case where the execution program the analysis program (i.e., "False" in the figure) confirmation is made upon the existence of the sub-manager 200 corresponding thereto (514). However, in those steps 514 and 515, if it is determined that there is no such the corresponding sub-manager 200 (i.e., "False" in the figure), an error is recorded/noticed (516, 518), respectively. After confirming the existence of the sub-manager 200 in the manner as mentioned above, an instruction is made upon execution of the program corresponding thereto (517) together with the "PROGRAM NAME" 131 (see FIG. 5) which was already disposed in advance. Thereafter, receiving a result from the sub-manager 200 (519), the manager 100 returns from the program execution process (i.e., turns back to the event receipt step 412 shown in FIG. 17).

Figure 20:
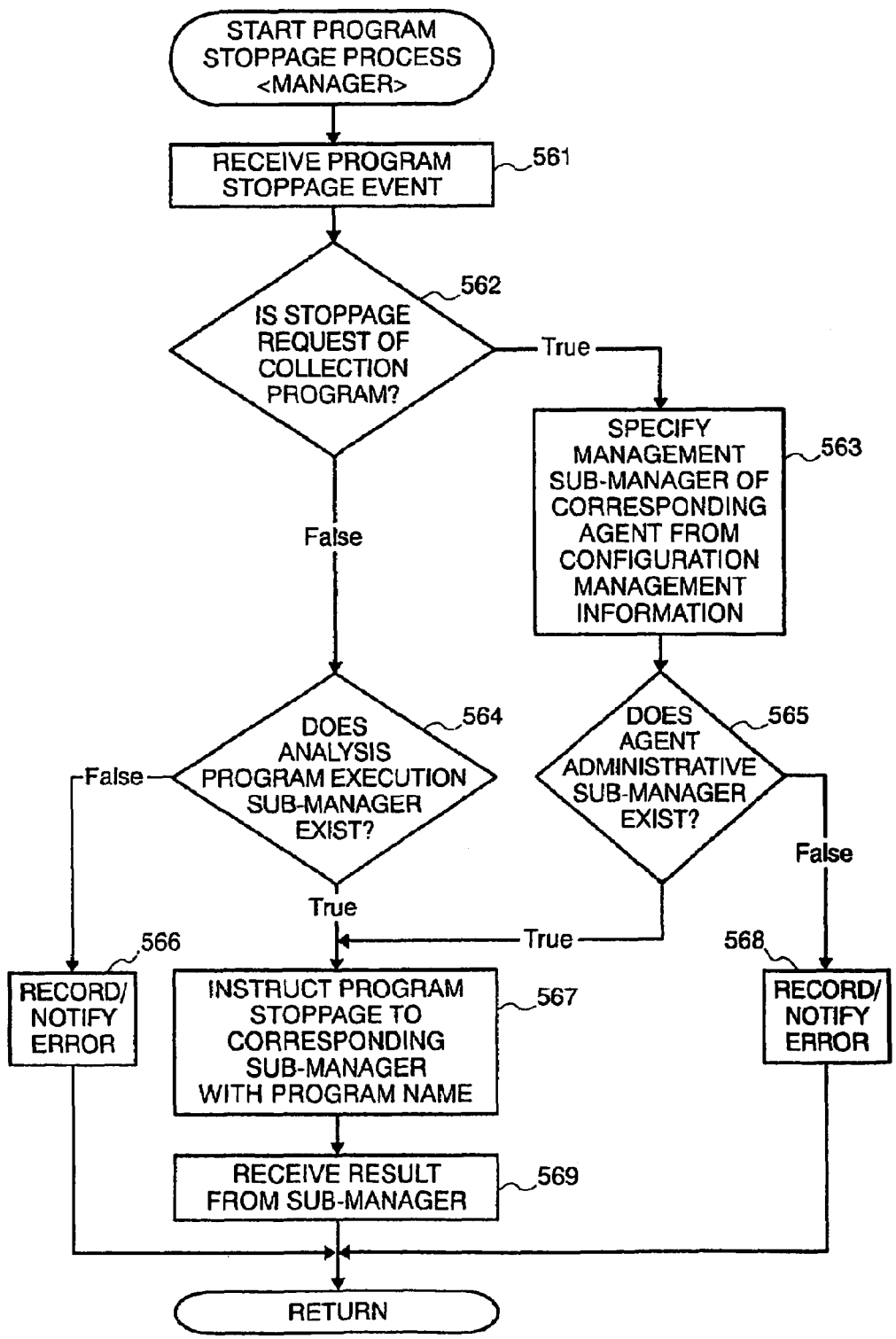
FIG. 20 is a flowchart for explaining the contents of program stoppage process, in the event processing of the manager shown in FIG. 17 mentioned above.

Further, FIG. 20 is a flowchart for showing an outlook of the program stoppage process (416) in the manager 100 mentioned above. In this process, first the manager 100 receives a program stoppage event (561), instructing the stoppage of the program from the scheduler 102 or the manager command input unit 106. Next, determination is made on the type of program (562) for identifying the sub-manager 200 instructing the stoppage of the program. Namely, it is determined on whether the program to be stopped is of the collection program or not. As a result thereof, if the program to be stopped is of the collection program (i.e., "True" in the figure), then the administrative sub-manager 200 of the agent corresponding thereto is identified based on the "CONFIGURATION MANAGEMENT INFORMATION" 114 (see FIG. 3) (563), thereby confirming the existence of the administration sub-manager 200 (565). On the other hand, if the stoppage program is of the analysis program (i.e., "False" in the figure), then confirmation is made on existent of the corresponding sub-manager (564). However, if there is no corresponding sub-manager 200 in those steps 564 and 565, an error is recorded/noticed (566, 568), respectively. After confirming the existence of the sub-manager in the manner mentioned above, an instruction is made to the corresponding sub-manager 200, to stop the program corresponding thereto (567), together with the "PROGRAM NAME" 131 (see FIG. 5), which was already distributed in advance. Thereafter, receiving the result from the sub-manager 200(569), the manager 100 returns from the program stoppage process (i.e., turning back to the event receipt step 412 shown in FIG. 17).

Figure 21:
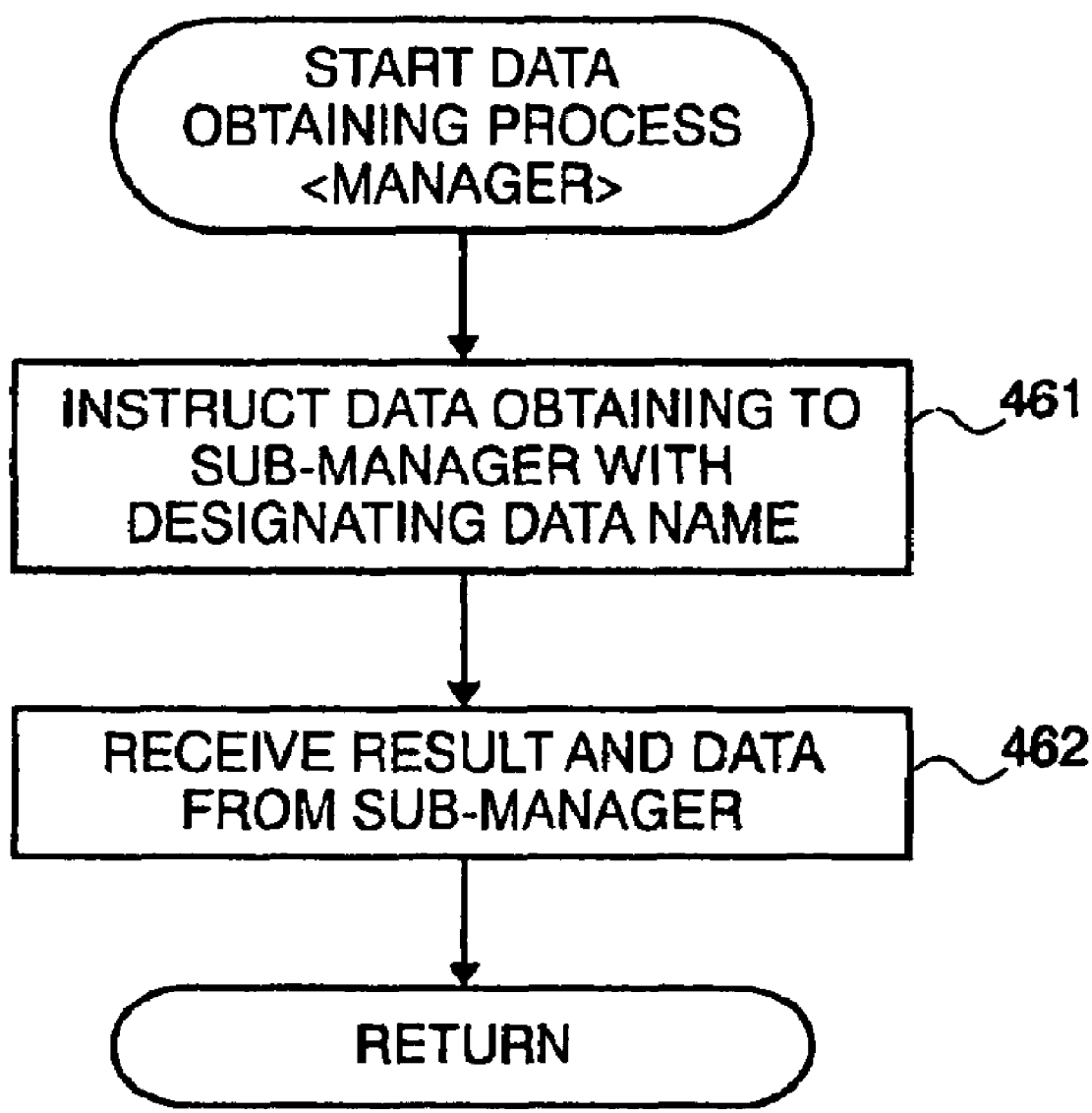
FIG. 21 is a flowchart for explaining the contents of data obtaining process, in the event processing of the manager shown in FIG. 17 mentioned above.

FIG. 21 is a flowchart for showing an outlook of the data obtaining process (417) in the manager 100 mentioned above. Namely, receiving a data-obtaining request from the scheduler 102 or manager command input unit 106, or the like, the manager 100 givens an instruction of obtaining the data corresponding thereto, to the sub-manager that manages the specified data (461). Namely, by designating the data name, an instruction of obtaining the data is given to the sub-manager 200 managing the data. Herein, the sub-manager 200 managing the data means the sub-manager, at which the program is disposed previously for the purpose of obtaining/producing the data of an object. Thereafter, the manager 100 receives the result thereof and the data of the object from the target sub-manager 200, and returns (462). Thus, the process turns back to the event receipt step 412 shown in FIG. 17.

As was mentioned in details in the above, the manager 100 distributes the programs for executing the continuous collection of data and the periodical analysis of collection data, which are necessary for conducting the operation management and the tuning upon the system, to the corresponding sub-manager(s) 200, with using the control display 11 mentioned above, for example. And also, the manager 100 is able to obtain the analysis data, selectively, to be stored into the storage mentioned above; i.e., an analysis result of the data collected through the programs distributed, which are executed by the agent 300 under the control of the sub-manager 200, thereby analyzing and observing it, again.

Figure 22:
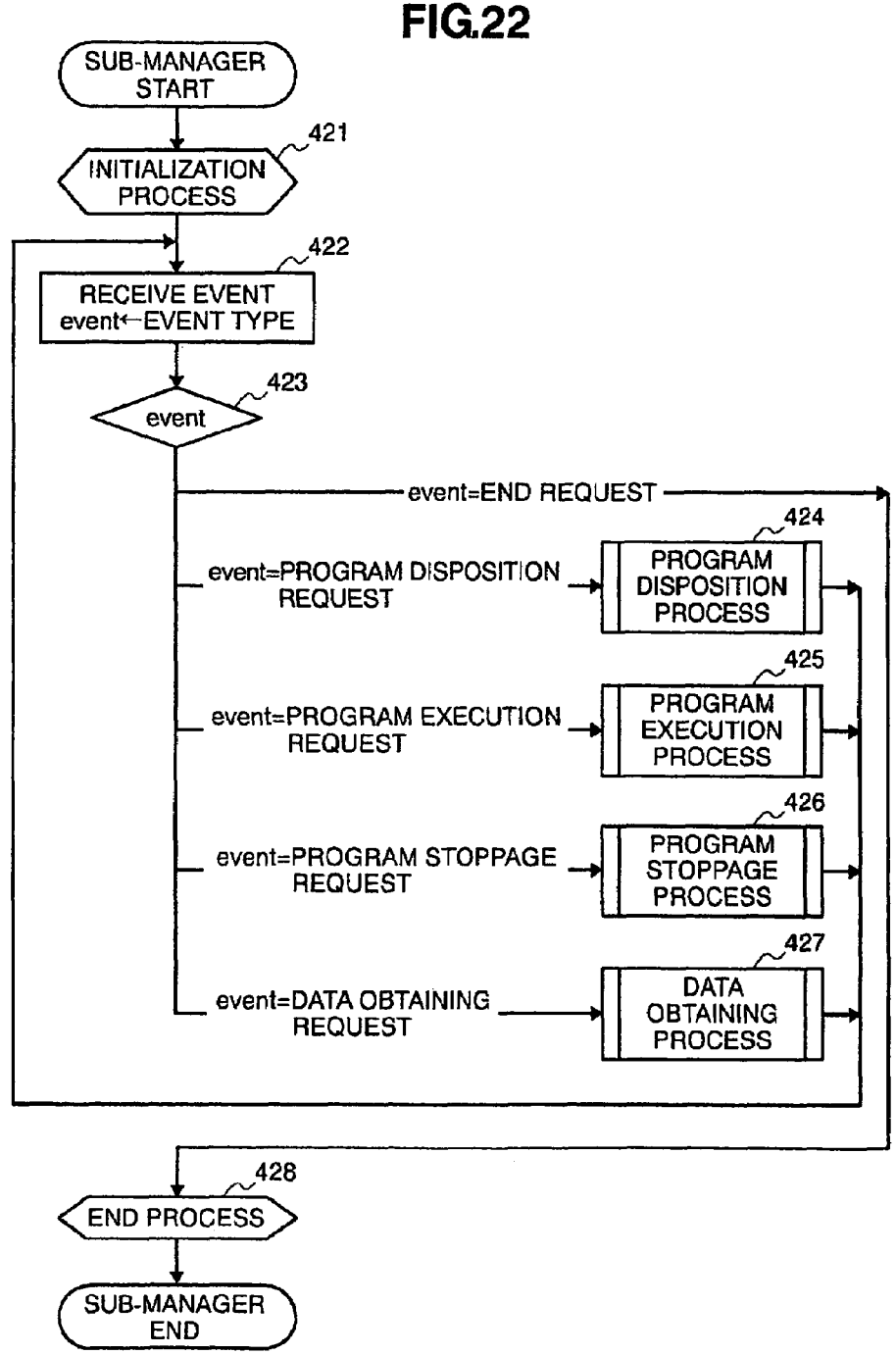
FIG. 22 is a flowchart for explaining the contents of event processing in the sub-manager.

Next, FIG. 22 is a flowchart for showing an outlook of the event processing in the sub-manager 200. After an initialization process (421), the sub-manager 200 enters into a loop for waiting an event, while blocking until arrival of the next event (422) (such as, the input from a user and/or the scheduled event, etc., for example). And, when the next event arrives, a check is made upon the contents of that event (423), and then a process is conducted depending upon the contents of the event arriving thereto. Further, as this event, there can be listed up "END REQUEST", "PROGRAM DISPOSITION REQUEST". "PROGRAM EXECUTION REQUEST", "PROGRAM STOPPAGE REQUEST", and "DATA OBTAINING REQUEST".

When receiving the "END REQUEST", the sub-manager 200 comes out from the event-waiting loop, so as to conduct an end process (428), and thereby completing the process. On the other hand, when receiving anyone of those "PROGRAM DISPOSITION REQUEST", "PROGRAM EXECUTION REQUEST". "PROGRAM STOPPAGE REQUEST", and "DATA OBTAINING REQUEST", the sub-manager 200 conducts "PROGRAM DISPOSITION PROCESS" (424), "PROGRAM EXECUTION PROCESS" (425), "PROGRAM STOPPAGE PROCESS" (426), or "DATA OBTAINING PROCESS" (427), respectively, and thereafter, the process returns to the event receipt step 422 mentioned above.

Figure 23:
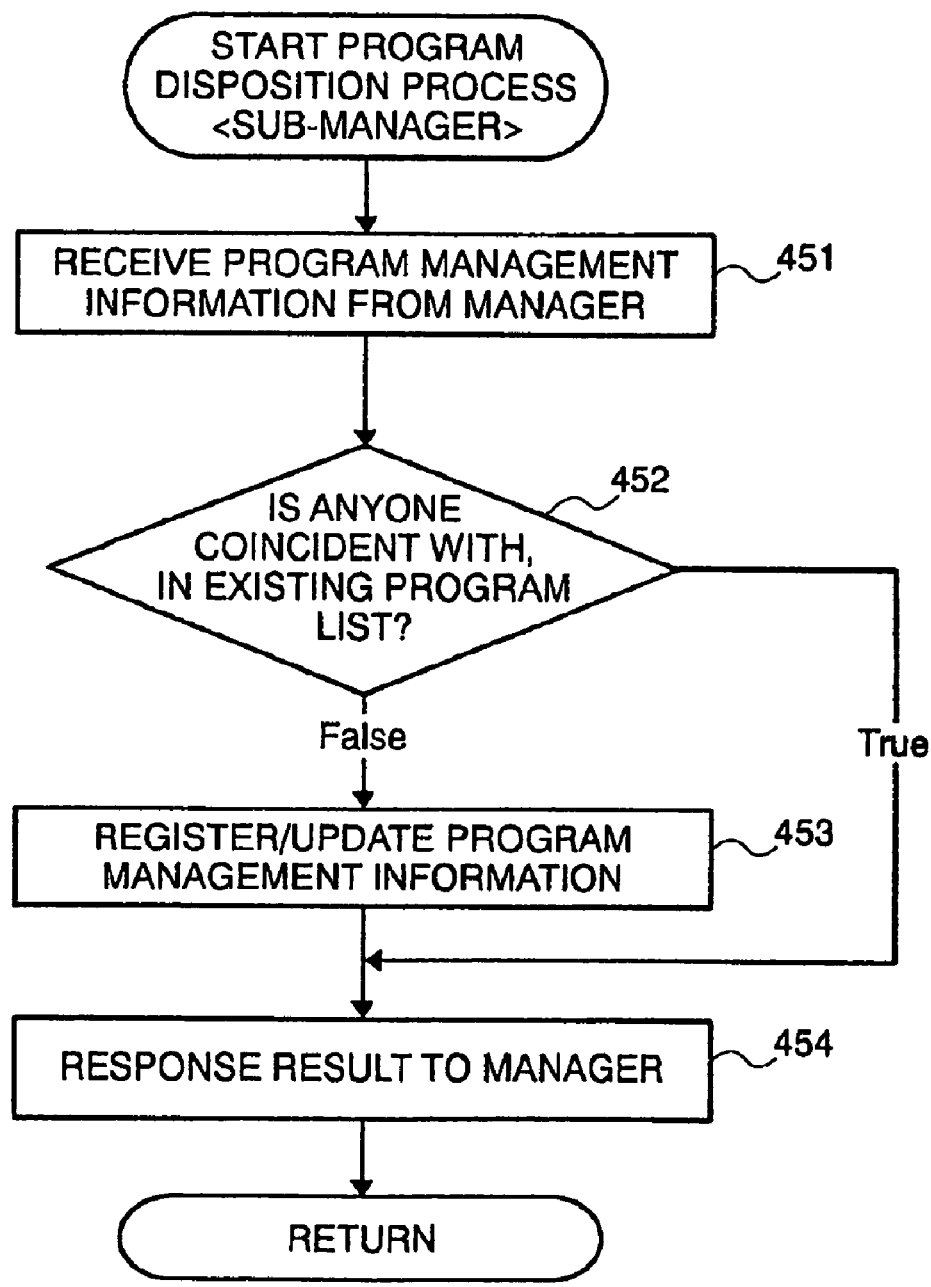
FIG. 23 is a flowchart for explaining the contents of program disposition process, in the event processing of the sub-manager shown in FIG. 22 mentioned above.

FIG. 23 is a flowchart for showing an outlook the "PROGRAM DISPOSITION PROCESS" (424) in the sub-manager 200 mentioned above. The sub-manager 200 receives the program(s) and the "PROGRAM MANAGEMENT INFORMATION" 130 (see FIG. 5) from the manager 100 (451). Then, confirmation is made on whether the same one exists or not within the existing program list, by means of the "PROGRAM MANAGEMENT INFORMATION LIST" 216 of the "CONFIGURATION MANAGEMENT INFORMATION" 214 (see FIG. 7), which are managed by the sub-manager 200. As a result thereof, if it is determined not to exist (i.e., "False" in the figure), the program management information 130 thereof is registered (453). On the other hand, if determining that there exists ("True" in the figure), the registration (453) of the program management information 130 is skipped. Finally, the result of the program disposition process is turned back to the upper manager 100 (454). Thereafter, the process returns to the event receipt step 422 mentioned above (see FIG. 22).

Figure 24:
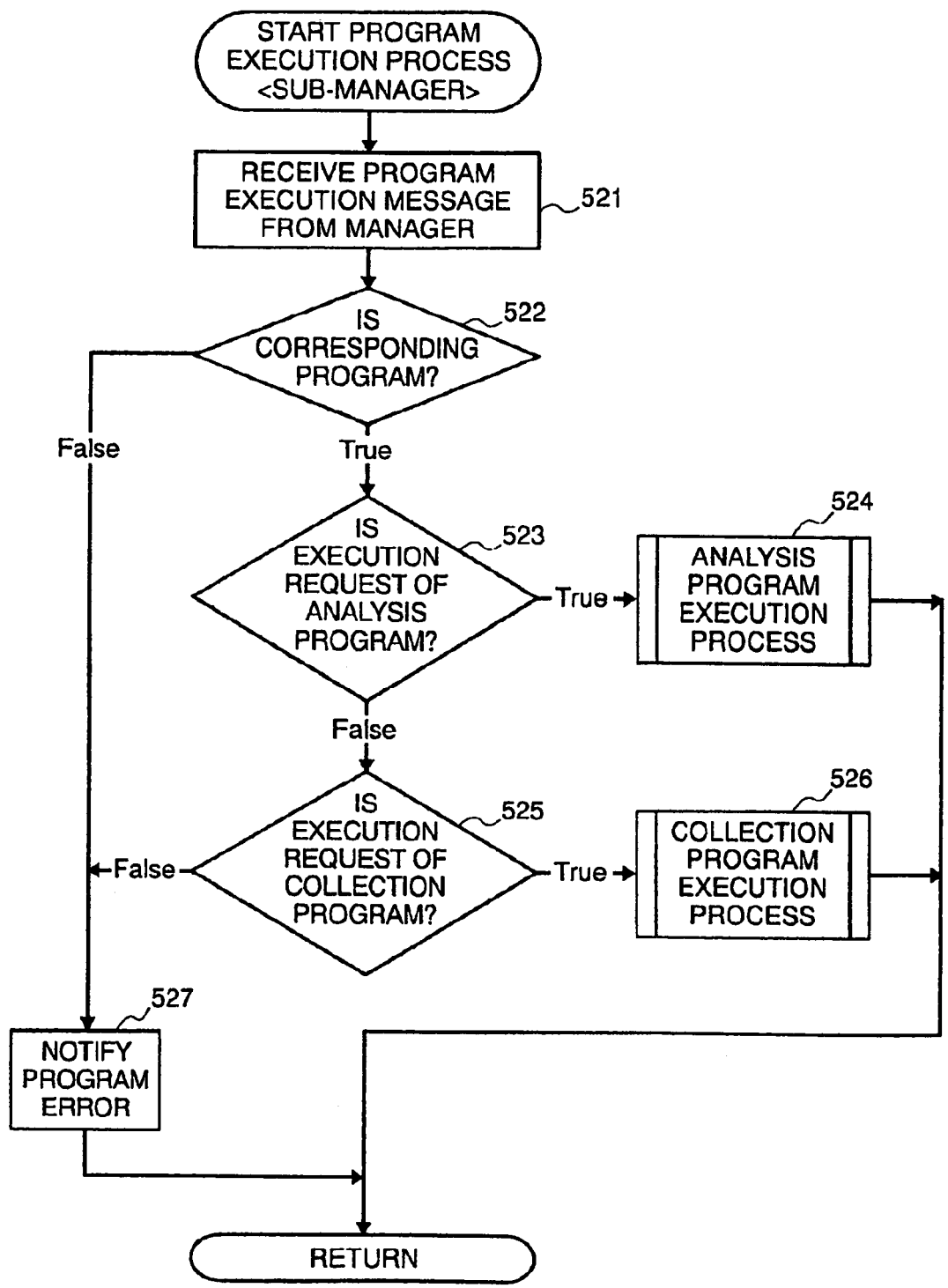
FIG. 24 is a flowchart for explaining the contents of program execution process, in the event processing of the sub-manager shown in FIG. 22 mentioned above.

FIG. 24 is a flowchart for showing an outlook of "PROGRAM EXECUTION PROCESS" (425) in the sub-manager 200 mentioned above. In this process, the sub-manager 200 receives a program execution instruction (or, a program execution message) together with the program name from the administration manager (521), and then it confirms the existence of the program(s) designated, through confirmation the fact on whether the program(s) exists or not corresponding thereto, from the "PROGRAM MANAGEMENT INFORMATION LIST" 216 (see FIG. 7) (522). As a result thereof, in the case where the program name designated on this "PROGRAM MANAGEMENT INFORMATION LIST" 216 is not yet registered, or no file exists at the location designated ("False" in the figure), then notification is made of a program error (527), thereby completing the process. On the other hand, when confirmation can be made upon the existence of program(s) ("True" in the figure), then checking is made upon which one the program(s) be, the analysis program or the collection program, which is/are designated in the execution request mentioned above, from the "PROGRAM TYPE" 243 of the "PROGRAM MANAGEMENT INFORMATION" 240 managed within the sub-manager 200 (523, 524). As a result thereof, if being the analysis program, "ANALYSIS PROGRAM EXECUTION PROCESS" (524) (which will be mentioned later) is executed, while if being the collection program, "COLLECTION PROGRAM EXECUTION PROCESS" (526) (which will be mentioned later) is executed. Further, herein if the "PROGRAM TYPE" 243 is neither the analysis program nor the collection program ("False" in the figure), it is also treated as an error; thus, notifying the program error (527). Thereafter, the process returns to the event receipt step 422 (see FIG. 22) mentioned above.

Figure 25:
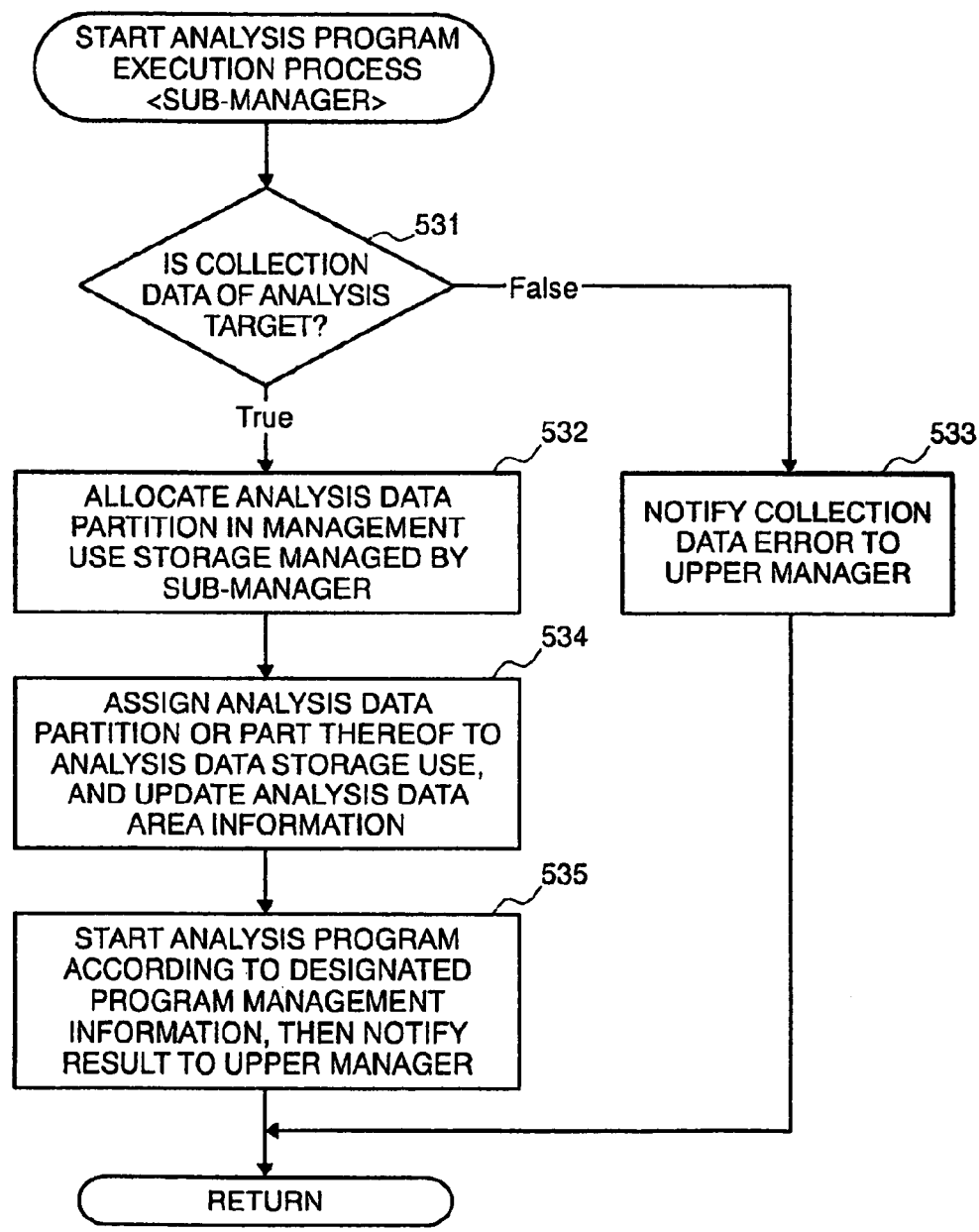
FIG. 25 is a flowchart for explaining the contents of analysis program execution process, in the event processing of the sub-manager shown in FIG. 24 mentioned above.

FIG. 25 is a flowchart for showing an outlook of "ANALYSIS PROGRAM EXECUTION PROCESS" (524) in the sub-manager 200 mentioned above. First of all, confirmation is made upon existence of collection data corresponding thereto and also upon whether the collection data of the analysis target exists or not (531), judging from the "COLLECTION DATA NAME" 245 (see FIG. 9) registered in the "PROGRAM MANAGEMENT INFORMATION" 240, which is obtained upon the basis of the program name designated as the execution request, and the "DATA NAME" 251 and the "DATA CLASSIFICATION" 252 (see FIG. 10) of the "DATA STORAGE INFORMATION" 250, which is managed in the "DATA STORAGE INFORMATION LIST" 217. As a result thereof, if the corresponding data is not yet registered, or the corresponding collection data is not yet collected ("False" in the figure), then no analysis is conducted, and notification is made to the upper manager 100 of collection data error (533). On the other hand, if existence can be confirmed on the corresponding collection data ("True" in the figure), an area for storing the analysis data therein (i.e., the analysis data partition 404) is allocated (532), in the management use storage 406 managed by the sub-manager 200 (see FIG. 16). However, if it is sufficient with the existing area, it is not always necessary to conduct the process of the step 532. Thereafter, the analysis data partition 404 or a part thereof is assigned to that for use of storing the analysis data therein, and further, the analysis data use area information is updated (534). Namely, with this, an area for storing the analysis results therein is allocated/reserved, and the "VOLUME MANAGEMENT INFORMATION" 270 is produced, as the location where the output results of the analysis program should be stored (see FIG. 13), and it is registered in the "ANALYSIS DATA AREA INFORMATION" 263. Then, the program Is started upon the basis of the "PROGRAM MANAGEMENT INFORMATION" 240 designated, and a result thereof is notified to the upper manager 100 (535). Thereafter, the process returns to the event receipt step 422 (see FIG. 22) mentioned above.

Figure 26:
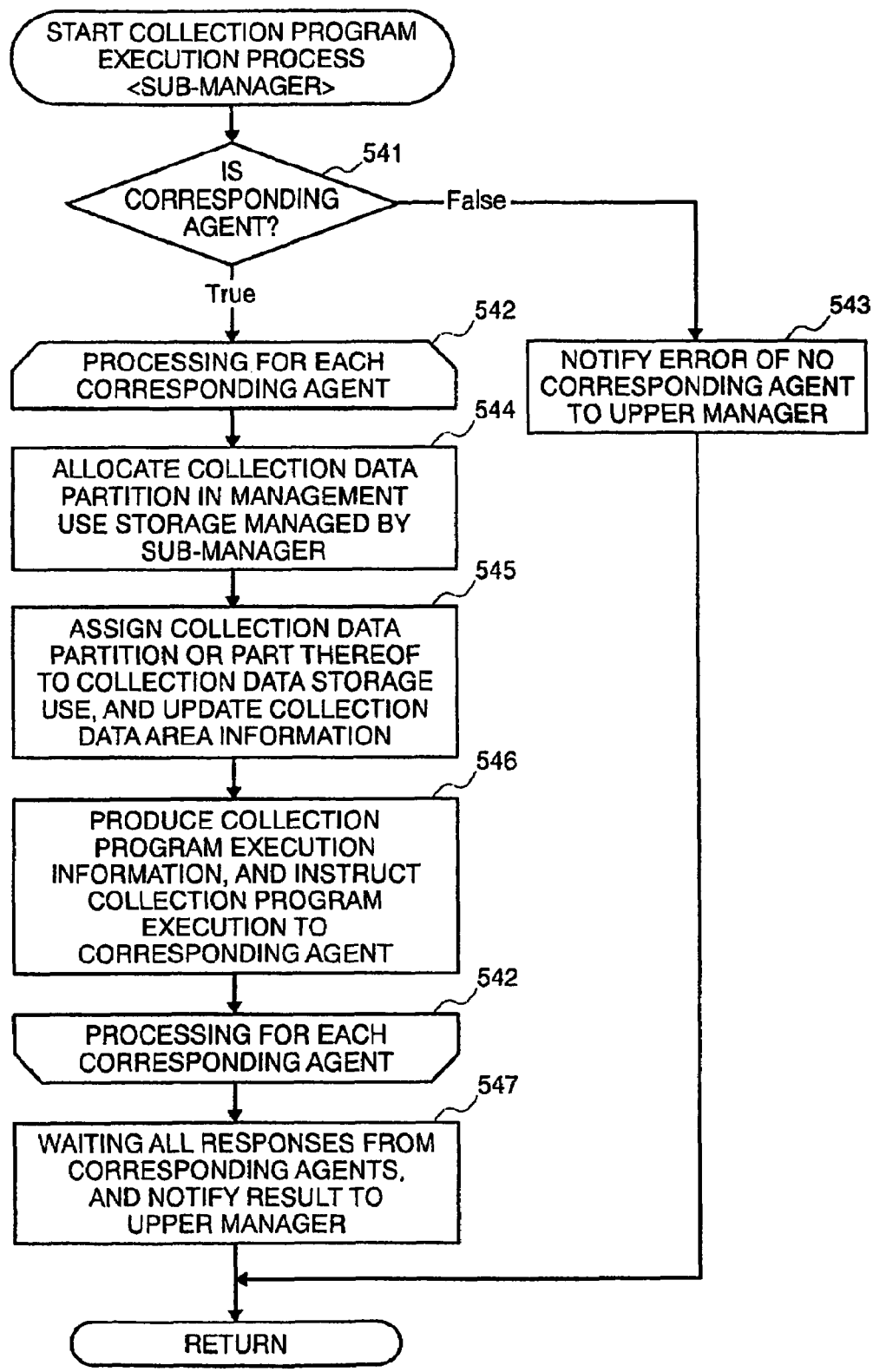
FIG. 26 is a flowchart for explaining the contents of collection program execution process, in the event processing of the sub-manager shown in FIG. 24 mentioned above.

FIG. 26 is a flowchart for showing an outlook of "COLLECTION PROGRAM EXECUTION PROCESS" (526) in the sub-manager 200 mentioned above. First, confirmation is made upon existence of the agent 300 corresponding thereto, judging from the information registered in the "PROGRAM MANAGEMENT INFORMATION" 240, which is searched the "PROGRAM NAME" 241 (see FIG. 9). In more details, the agent corresponding thereto, identified by the information of the "EXECUTION SUB-MANAGER/AGENT NAME" 249 and the "TARGET PLATFORM" 244, is confirmed from the "MANAGEMENT TARGET AGENT LIST" 215 (see FIG. 7) (541). As a result thereof, when no corresponding agent 300 cannot be found ("False" in the figure), an error is notified to the upper manager 100 that there is no corresponding agent (543), thereby completing the process of this collection program execution process.

On the other hand, if there exists the agent corresponding ("True" in the figure), the following process is conducted on each of the agents (542). First, for allocating an area for storing the collection data therein, the collection data use partition 403 is allocated on the management use storage 406 (see FIG. 16) managed by the sub-manager 200 (544). Herein, if it is sufficient with the existing area, it is not always necessary to conduct the process of the step 544. Thereafter, the collection data partition 403 or a part thereof is assigned to that for use of storing the collection data therein, and further, the collection data area information is updated (545). Namely, an area for storing the collection results therein is allocated/reserved, and the "VOLUME MANAGEMENT INFORMATION" 270 is created, as the location where the output results of the collection program should be stored (see FIG. 11), and it is registered in the "COLLECTION DATA AREA INFORMATION" 262 (see FIG. 12). Then, the "COLLECTION PROGRAM EXECUTION INFORMATION" 330 is produced from the program management information 240 corresponding thereto (see FIG. 15), an instruction is made to the agent 300 at the target, to execute the program, together with the collection program execution information 330 (546). Thereafter, while waiting responses from all of the corresponding agents, a result thereof is notified to the upper manager (547). However, in this instance, it is possible to provide an appropriate timeout for waiting the responses. Thereafter, the process returns to the event receipt step 422 (see FIG. 22) mentioned above.

Figure 27:
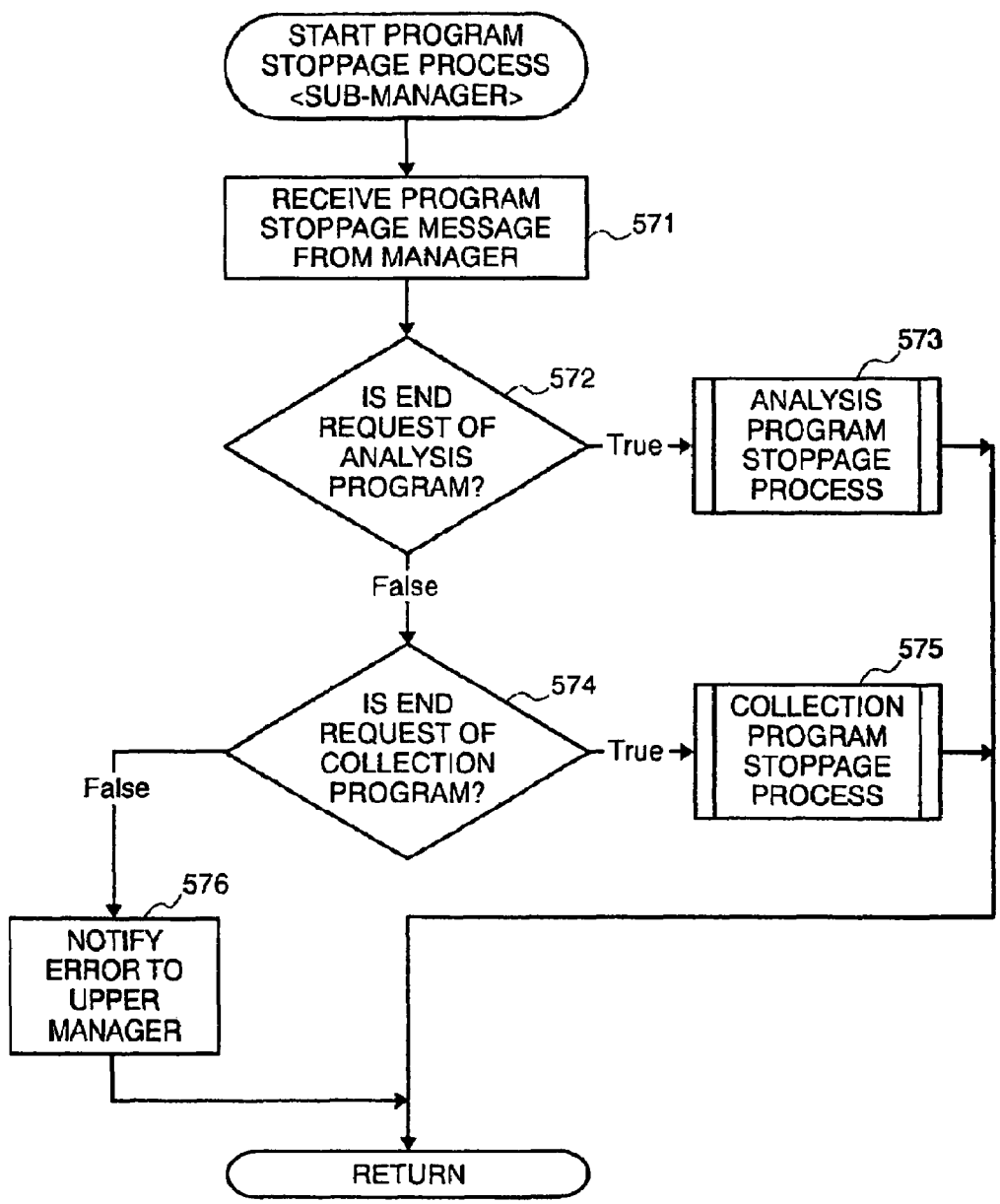
FIG. 27 is a flowchart for explaining the contents of program stoppage process, in the event processing of the sub-manager shown in FIG. 22 mentioned above.

FIG. 27 is a flowchart for showing an outlook of "PROGRAM STOPPAGE PROCESS" (426) in the sub-manager 200 mentioned above. In this process, the sub-manager 200 receives the program stoppage instruction (or, message) together with the program name, from the administration manager 100 (571). And, confirmation is made upon the program designated in this stoppage request is either "ANALYSIS PROGRAM" or "COLLECTION PROGRAM", from the "PROGRAM TYPE" 243 (see FIG. 9) of the "PROGRAM MANAGEMENT INFORMATION" 240, which is managed within the sub-manager 200 (572, 574). If it is the analysis program, the "ANALYSIS PROGRAM STOPPAGE PROCESS" is executed (573) (which will be mentioned later), while if being the collection program, the "COLLECTION PROGRAM STOPPAGE PROCESS" is executed (575) (which will be mentioned later). However, in that instance, if the "PROGRAM TYPE" 243 is neither the analysis program nor the collection program, it is treated as an error, thereby to be notified to the upper manager (576). Thereafter, the process returns to the event receipt step 422 (see FIG. 22) mentioned above.

Figure 28:
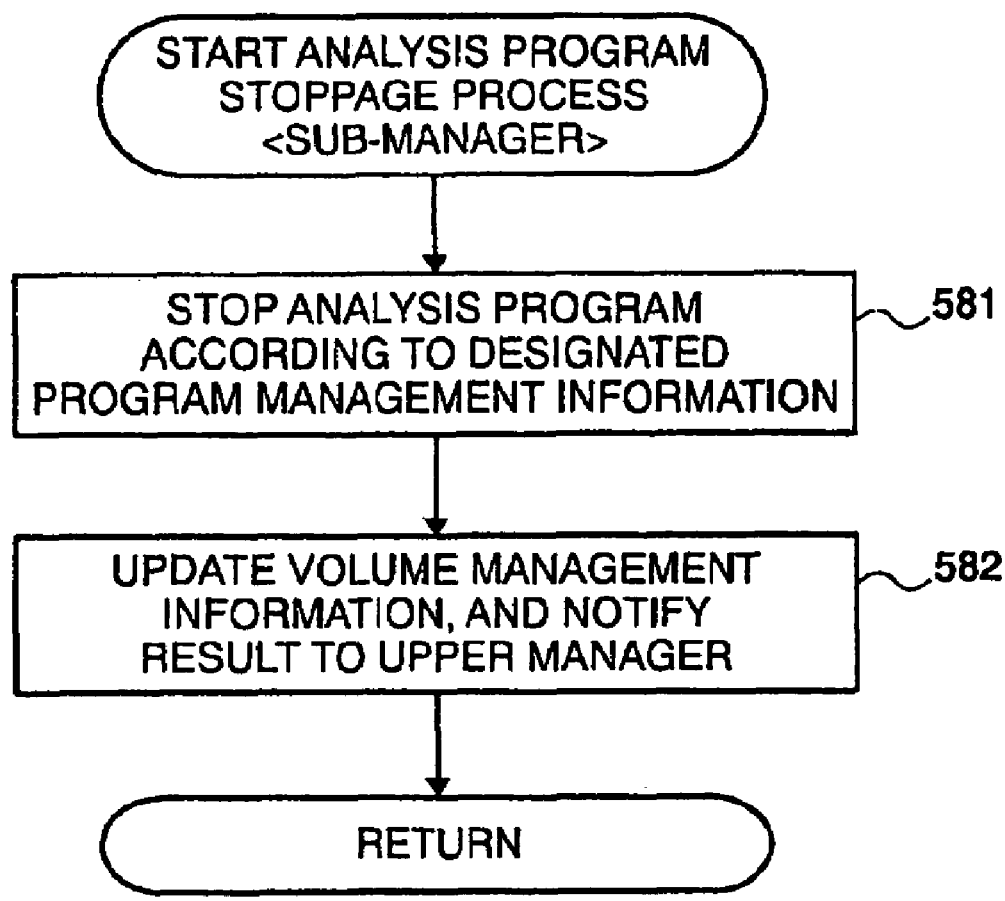
FIG. 28 is a flowchart for explaining the contents of analysis program stoppage process, in the event processing of the sub-manager shown in FIG. 27 mentioned above.

FIG. 28 is a flowchart for showing an outlook of the analysis program stoppage process (573) in the sub-manager 200. In the sub-manager 200, the analysis program corresponding thereto is stopped upon the basis of the "PROGRAM MANAGEMENT INFORMATION" 240 (see FIG. 9) having the program name designated (581). Further, the name of the program stopped is deleted from the "USING PROGRAM" 274 (see FIG. 13) of the "VOLUME MANAGEMENT INFORMATION" 270, while updating the "VOLUME MANAGEMENT INFORMATION" 270 of the "ANALYSIS DATA USE AREA INFORMATION" 263, and further a result thereof is noticed to the upper manager (582). Thereafter, the process returns to the event receipt step 422 (see FIG. 22) mentioned above.

Figure 29:
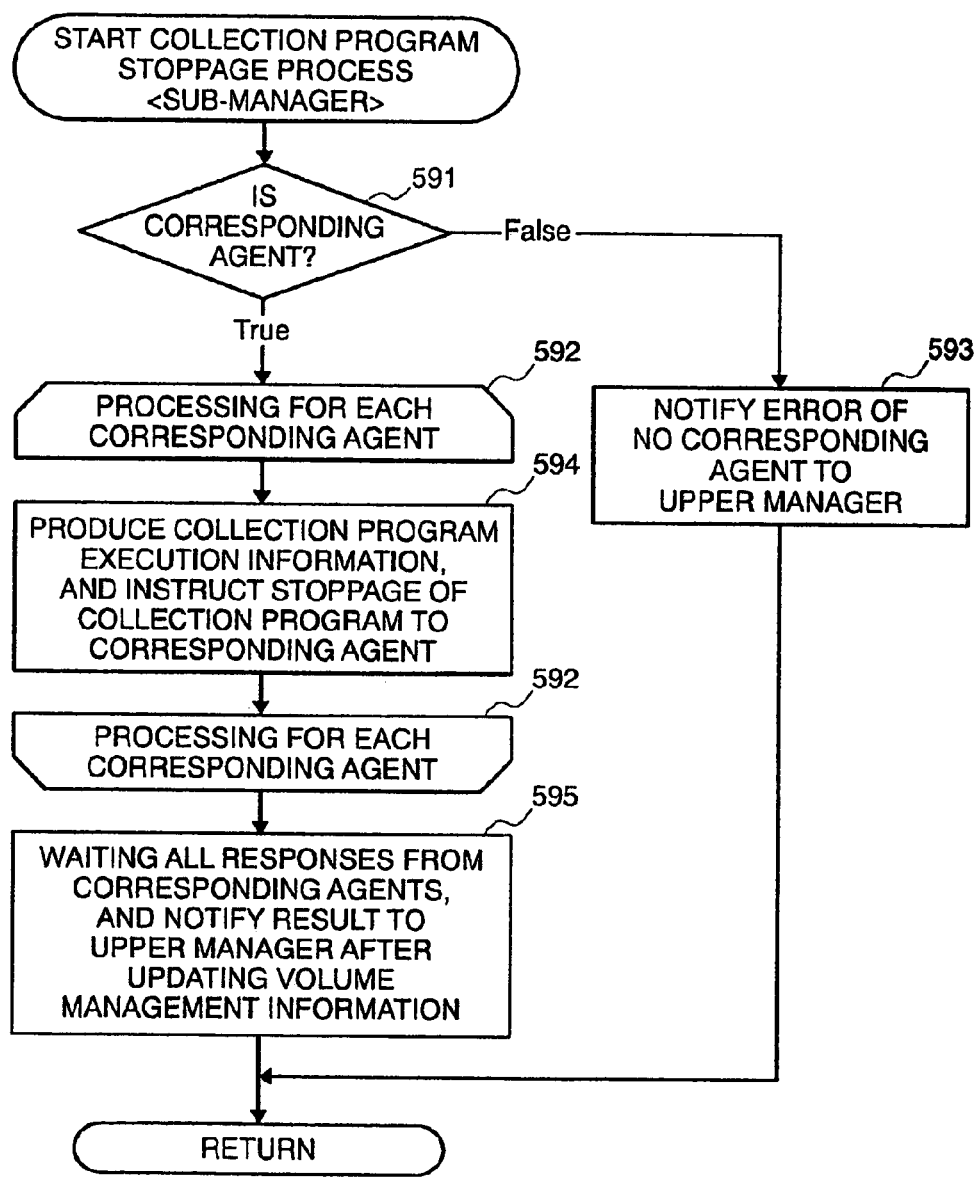
FIG. 29 is a flowchart for explaining the contents of collection program stoppage process, in the event processing of the sub-manager shown in FIG. 27 mentioned above.

FIG. 29 is a flowchart for showing an outlook of the collection program stoppage process (575) in the sub-manager 200. First, confirmation is made upon whether the corresponding agent 300 exists or not, judging from the information, registered in the program management information 240, which is searched out by the program name 241. In more details, the agent 300 corresponding thereto is confirmed (591), judging from the information of the "EXECUTION SUB-MANAGER/AGENT NAME" 249 and the "TARGET PLATFORM" 244 (see FIG. 9), among the "MANAGEMENT TARGET AGENT LIST" 215 (see FIG. 7). As a result thereof, if no corresponding agent 300 can be found ("False" in the figure), an error is notified to the upper manager 100 that there is no corresponding agent (593), thereby completing the process of the collection program stoppage process. On the other hand, if there is the agent corresponding thereto ("True" in the figure), the "COLLECTION PROGRAM EXECUTION INFORMATION" 330 (see FIG. 15) is produced from the "PROGRAM MANAGEMENT INFORMATION" 240 of the program to be stopped, for each of the agents (592), and an instruction of stopping the program is made to the targeted agent corresponding thereto, together with the collection program execution information 330 (594). Thereafter, while waiting responses from all of the corresponding agents 300, renewal is made on the "VOLUME MANAGEMENT INFORMATION" 270 (see FIG. 13), and thereafter a result thereof is notified to the upper manager (595). However, in this instance, it is possible to provide an appropriate timeout for the waiting of responses. Thereafter, the process returns to the to the event receipt step 422 (see FIG. 22) mentioned above.

Figure 30:
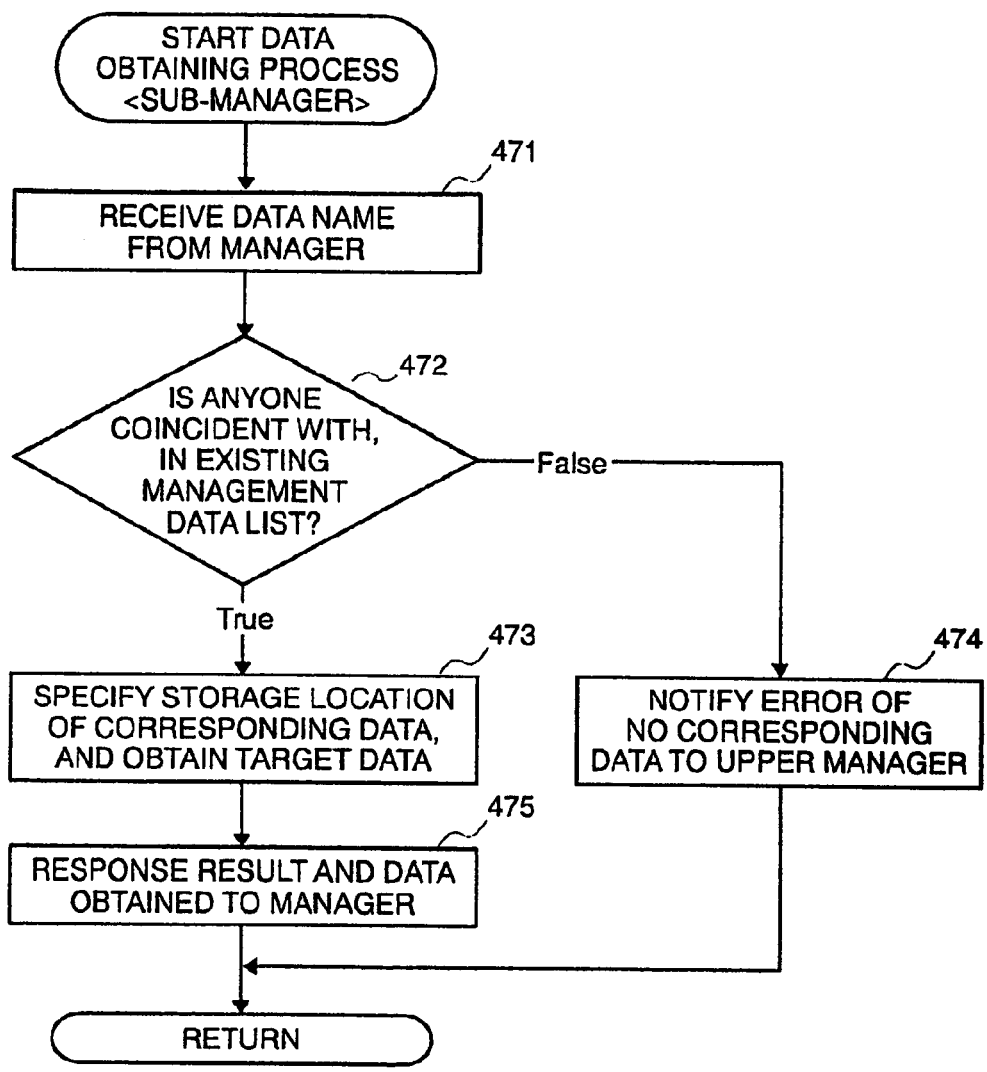
FIG. 30 is a flowchart for explaining the contents of data obtaining process, in the event processing of the sub-manager shown in FIG. 22 mentioned above.

FIG. 30 is a flowchart for showing an outlook of "DATA OBTAINING PROCESS" (427) in the sub-manager 200 mentioned above. In this process, first the sub-manager 200 receives the data name at the target from the manager 100 (471), and confirms the existence of it through searching the corresponding data from the "DATA STORAGE INFORMATION LIST" 217 (see FIG. 7), which is managed by the corresponding manager 200. Namely, it is determined on whether there is the coincident one or not, within the existing management data list (472). As a result thereof, if the target data cannot be found ("False" in the figure), an error is notified to the upper manager that there is no data corresponding thereto (474). On the other hand, if the target data can be found ("True" in the figure), the storage location of it on the storage 400 is obtained from the data storage information 250 corresponding thereto, and then the target data corresponding thereto is obtained through accessing to the storage 400 (473). Thereafter, the result and the data obtained are notified/answered to the upper manager (475). However, after that, the process returns to the event receipt step 422 (see FIG. 22) mentioned above.

As was mentioned in the above, the sub-manager 200 running on the second management use computer 20, which is the computer for use of management by the sub-manager, makes managements upon the following, as the management functions and the management information thereof:

(1) information of the agent(s), as the management target;

(2) program(s) for obtaining various kinds of information data, such as, performance, etc., in the agent(s);

(3) program(s) for analyzing or observing the information data in the sub-manager;

(4) the above-mentioned information data, and analysis data as the analysis result thereof; and (5) an area within the storage for piling up the above-mentioned information data and the analysis data therein. Namely, it is possible for the sub-manager to manage the storage 400, which stores various kinds of information therein, and to manage the program(s), which is/are distributed from the manager 100 mentioned above, for carrying out the continuous collection of data and the periodical analysis upon the collection data, being indispensable or essential for achieving the operation/management or tuning of a system, and is possible to make the agent(s) execute, or stop the program(s) under the control thereof, and further, to obtain a result and/or data thereof, as well as, to manage the result and the data obtained.

Figure 31:
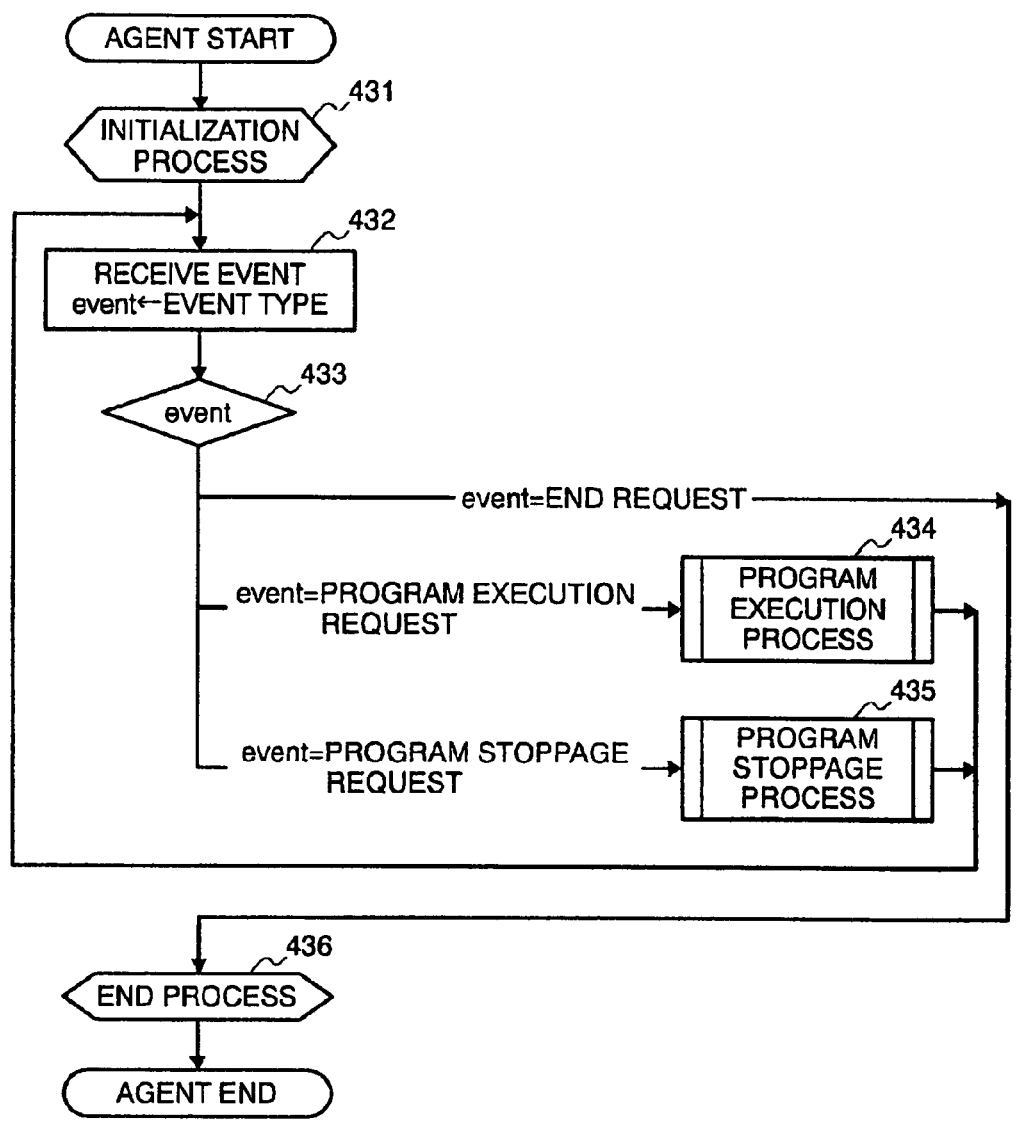
FIG. 31 is a flowchart for explaining the contents of event processing in the agent.

Next, FIG. 31 is a flowchart for showing an outlook of the event process conducted in the agent 300 mentioned above. First, after executing the initialization process (431), the agent 300 enters into a loop for waiting an event, while blocking until arrival of the next event (432). And, when the event arrives, a check is made upon the contents of that event (433), and then a process is conducted depending upon the contents of the event arriving thereto. Further, as this event, there are included "END REQUEST", "PROGRAM EXECUTION REQUEST" and "PROGRAM STOPPAGE REQUEST".

Each the agent 300 comes out from the event waiting loop when receiving the "END REQUEST", so as to conduct an end process (436), and thereby completing the process. On the other hand, when receiving the "PROGRAM EXECUTION REQUEST", the agent conducts "PROGRAM EXECUTION PROCESS" (434), which will be explained below, in details thereof, or when receiving the "PROGRAM STOPPAGE REQUEST", it conducts "PROGRAM STOPPAGE PROCESS" (435), which will is be also explained below, in details thereof.

Figure 32:
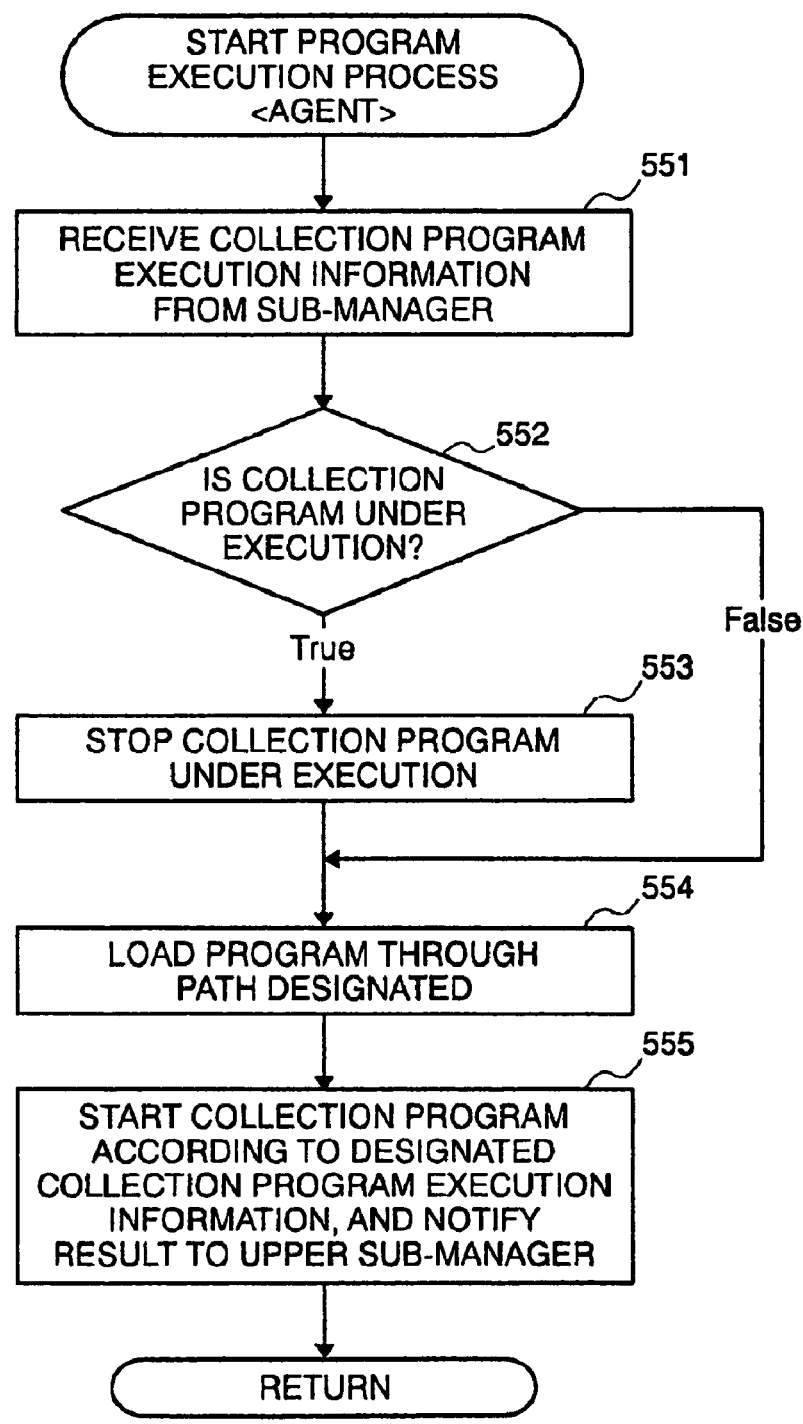
FIG. 32 is a flowchart for explaining the contents of program execution process, in the event processing of the agent shown in FIG. 31 mentioned above.

FIG. 32 is a flowchart for showing an outlook the "PROGRAM EXECUTION PROCESS" (434) mentioned above, in the each agent 300. First, the agent 300 receives the "COLLECTION PROGRAM EXECUTION INFORMATION" 330 (see FIG. 15) from the administration sub-manager 200 (551), and then it confirms on whether the program to be executed lies or not within the collection programs, which are under execution (552). As a result thereof, if it is within the collection programs under execution ("True" in the figure), first of all, the agent 300 stops the collection program (553), and then moves into the next step 554. On the other hand, if it is determined that there is no program to be executed within the collection programs under execution ("False" in the figure), jumping over the step 553 mentioned above, moves into the next step 554. In this next step 554, upon the basis of the information of the "PROGRAM STORAGE LOCATION" 332 of the collection program execution information 330, the program stored within the storage 400 mentioned above is loaded from the path designated (554). Thereafter, the collection program designated is started up, upon basis of, such as, the "PROGRAM ARGUMENT" 333 and the "DATA STORAGE LOCATION" 335, etc., for example, of also the collection program execution information 330 mentioned above, and a result thereof is notified to the upper sub-manager (555). Further, thereafter, the process returns to the event receipt step 432 (see FIG. 31) mentioned above.

Figure 33:
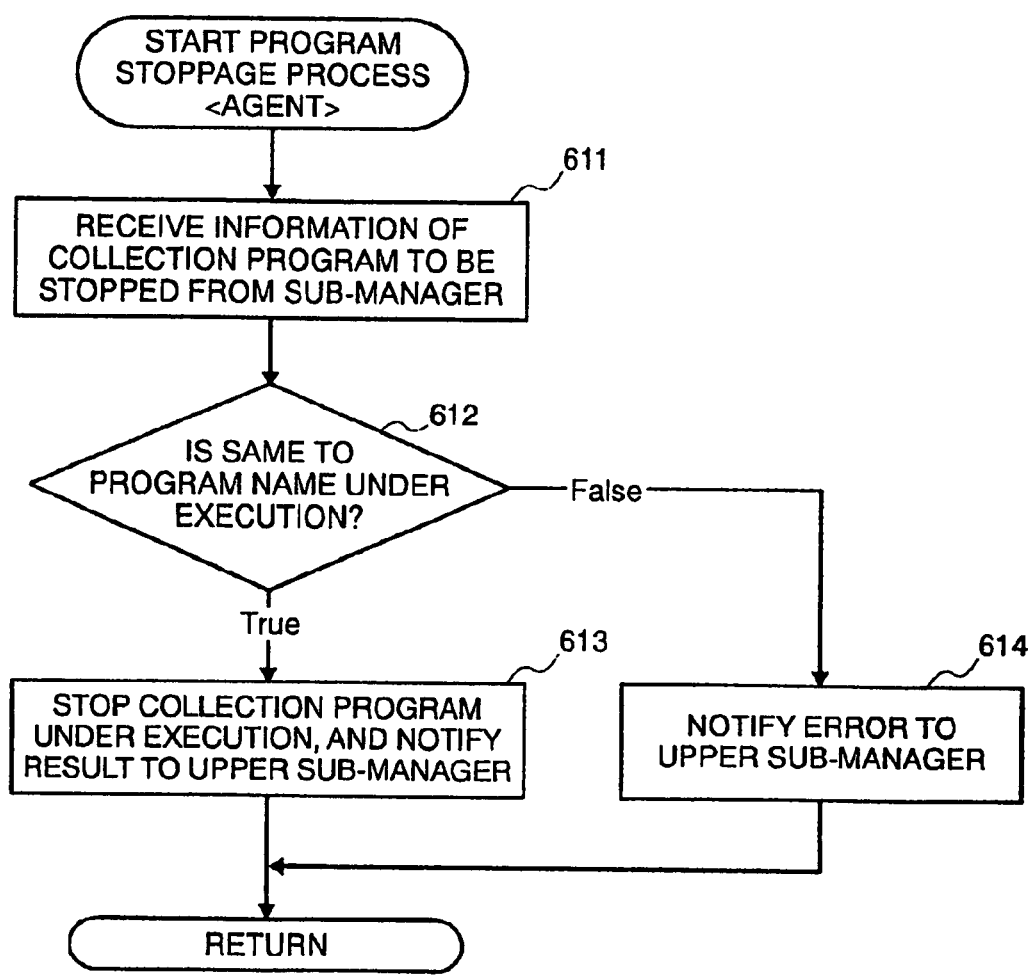
FIG. 33 is a flowchart for explaining the contents of program stoppage process, in the event processing of the agent shown in FIG. 31 mentioned above.

Also, FIG. 33 is a flowchart for showing an outlook the "PROGRAM STOPPAGE PROCESS" (435) mentioned above, in the each agent 300. In this process, first the agent 300 receives the collection program execution information 330 (see FIG. 15) from the sub-manager 200 of management origin (611), and confirms on whether the program to be stopped is same or not to the collection program now under execution (612). As a result thereof, if not same ("False" in the figure), an error is notified to the upper sub-manager (614), but without stopping the collection program. On the other hand, if being the same ("True" in the figure), stopping accessing to the storage 400, as well as, stopping the collection program under execution, a result thereof is informed to the upper sub-manager (613). Thereafter, the process returns to the event receipt step 432 (see FIG. 31) mentioned above.

As was mentioned above, according to an instruction supplied from the administration sub-manager 200, each the agent 300 reads out the program necessary for information collection and processing thereof, so as to execute it, from the above-mentioned storage 400 being shared in common, and it stores a result thereof, again, into the predetermined partition of the storage 400, which is managed by the sub-manager 200. Thus, it prevents the generation of a large amount of information data to be transmitted through the network 600, on which the business use computers 30 operate, and escapes the wide area network from suppression of the band area thereof due to that data transmission, and at the same time, further it enables an enormous amount of data necessary for the system management to be shared between the sub-manager(s) 200 and the each agent 300. And, with this, it is also possible to increase an operating efficiency of the business use computers. Also, as was mentioned above, by storing the information, such as, the performance data, etc. obtained by the agent, into the area within the storage 400, to which both the sub-manager 200 and the agent 300 have reference (i.e., the "ANALYSIS/COLLECTION PROGRAM PARTITION" 402 of the management use storage 406 shown in FIG. 16), the sub-manager 200 achieves an integrated management upon the information stored by the plural numbers of the agent 300.

Further, the area within the storage 400, which is shared in common, is managed by the sub-manager 200, as was mentioned above, and when the agent 300 stores the information data obtained, it is controlled by the sub-manager, so that it is accessible therefrom. Also, the program(s) to be executed within the agent 300 for obtaining various kinds of information data is/are managed within the area in the storage 400 by the sub-manager 200; therefore, with the instruction from the manager 200, the agent 300 obtains the program corresponding to the instruction from the common storage 400, so as to execute it. Namely, sharing the information data between the sub-manager 200 and the agent 300, through the storage 400, enables the program to move into the place where the information data exists, thereby to execute the analysis and/or observation thereupon. Also, in the example shown in the above, the agent 300 is only described to execute the information collection program, upon the instruction given from the sub-manager 200, however it should not be limited thereto, according to the present invention, however further it is possible to execute the analysis program, upon the instruction also given from the sub-manager 200.

As was fully explained in the above, according to the present invention, in a collection method of information, an analysis method or an observation method of the collected information, and also an operation method thereof, with using a computer and storage therein, and in a system, in which the computer is constructed with a management computer(s), on each of which a sub-manager operates for managing the storage, into which the information is stored, and a business computer(s), on which an agent operates for collecting information of, such as, the program(s) and/or operating system(s), etc., wherein the storage is controlled upon the area where the information should be stored by the sub-manager, and is connected to a network, the agent stores the information obtained into the area within the storage prepared by the sub-manager, and the information stored therein is managed by the sub-manager.

Also, with the information management system mentioned above, the sub-manager comprises a means for storing the program of analyzing or observing the information stored by the agent, within the storage, thereby analyzing or observing an arbitrary one of the information mentioned above, through operating the program thereon. Also, the sub-manager comprises a means for managing the agent mentioned above, and a means for managing the information within the agent mentioned above, and the sub-manager lets the agent to execute an arbitrary one of the program targeting on an arbitrary information, and lets the agent to store a result of analysis or observation thereof into the area within the storage by means of the agent mentioned above.

Further, in the information management system mentioned above, separating from the sub-manager mentioned above, there is provided the first management computer 10, on which the manager 100 operates for coordinating the plural numbers of sub-managers, and this manager 100 comprises a means for distributing the programs to the sub-managers 200, and a means for bringing the process of analysis or observation to be executed, with designating the program and the information which are managed by the sub-manager. Further, in more details thereof, the said manager 100 comprises a means for collecting the information, which is stored within the storage 400 managed by the sub-manager 200, by designating it from a control display 11 thereof, and the said manager 100 is able to analyze or observe the information collected from the plural numbers of sub-managers 200, again, through selecting the information collected the plural numbers of sub-managers 200.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An information management system, comprising:
a first network enabling communication;
a first management computer connected with said first network;
a manager operating on said first management computer for managing management targets in the system;
a business computer connected with said first network;

a plurality of agents operating on said business computer for executing collection and analysis of information data collected on one or more of said management targets;

a second management computer connected with said first network and also connected with a second network, said second network enabling communication separate from said first network;

a shared storage for storing information, said shared storage being connected to said second management computer through said second network, said shared storage further being connected to said business computer through said second network, wherein said shared storage is separate from said second management computer and said business computer, and able to communicate with said second management computer and said business computer through said second network; and a sub-manager operating on said second management computer for managing said agents under control of said manager, wherein said shared storage includes a program partition for storing programs accessed and used by said agents for collecting and analyzing said information data, said programs in the shared storage being managed by said sub-manager, wherein said sub-manager is configured to integrate management of the plurality of agents via the shared storage, such that when said agents store the information data in the shared storage, the information data is controlled by the sub-manager, and such that loading of programs to be executed within each agent for obtaining the information data is managed within the shared storage by the sub-manager, wherein, in response to an instruction supplied from the sub-manager, the agents are configured to read out from the shared storage a specified program for collection of the information data, execute the specified program, and store a result in the shared storage, wherein said manager is configured to initiate an execution process by specifying the sub-manager corresponding to one or more of said agents, and by sending program management information to the sub-manager with the specified program name, wherein said sub-manager is configured to receive the program management information from said manager and determine which agents managed by the sub-manager correspond to the program management information, wherein said sub-manager allocates a collection data partition in the shared storage managed by the sub-manager for use for information data storage, produces collection program execution information, and sends the instruction for the specified program execution to each corresponding agent, and wherein each corresponding agent receives the instruction from said sub-manager, stops any collection program already under execution, loads the specified program from the shared storage through a path designated by said instruction, and starts the newly-loaded specified program according to designated collection program execution information included in said instruction.

2. The information management system, as described in claim 1, wherein said sub-manager is configured to instruct a particular agent to execute an arbitrary one of said programs stored in said shared storage targeting on arbitrary information, enabling the particular agent to store a result of analysis or observation of said arbitrary information into the shared storage managed by said sub-manager.

3. The information management system, as described in claim 2, wherein said manager is able to select all or part of analysis data generated by said programs stored in said shared storage and executed by said agents or said sub-manager, said analysis data being stored within an analysis partition in said shared storage, so as to enable said manager to observe or re-analyze said analysis data.

4. An information management sub-system within a system, said information management sub-system comprising:

a first network enabling communication;

a first management computer connected with said first network;

a manager operating on said first management computer for managing management targets in the system;

a business computer connected with said first network;

a plurality of agents operating on said business computer for executing collection or analysis of information data collected on one or more of said management targets;

a second management computer connected with said first network and also connected with a second network, said second network enabling communication separate from said first network;

a shared storage for storing information, said shared storage being connected to said management computer through said second network said shared storage further being connected to said business computer through said second network, wherein said shared storage is separate from said second management computer and said business computer, and able to communicate with said second management computer and said business computer through said second network; and a sub-manager operating on said second management computer for managing said agent, wherein the information data collected on said management targets by said agents is stored in a collection data partition in the shared storage, wherein the information data stored in said shared storage area is shared, in common, through said second network, between said agents and said sub-manager, wherein said shared storage includes a program partition for storing programs accessed and used by said agents for collecting and analyzing said information data, said programs in the shared storage being managed by said sub-manager, wherein said sub-manager is configured to integrate management of the plurality of agents via the shared storage, such that when said agents store the information data in the shared storage, the information data is controlled by the sub-manager, and such that loading of programs to be executed within each agent for obtaining the information data is managed within the shared storage by the sub-manager, wherein, in response to an instruction supplied from the sub-manager, the agents are configured to read out from the shared storage a specified program for collection of the information data, execute the specified program, and store a result in the shared storage, wherein said manager is configured to initiate an execution process by specifying the sub-manager corresponding to one or more of said agents, and sending program management information to the sub-manager with the specified program name, wherein said sub-manager is configured to receive the program management information from said manager and determine which agents managed by the sub-manager correspond to the program management information, wherein said sub-manager allocates a new collection data partition in the shared storage managed by the sub-manager for use for information data storage, produces collection program execution information, and sends the instruction for the specified program execution to each corresponding agent, and wherein each corresponding agent receives the instruction from said sub-manager, stops any collection program already under execution, loads the specified program from the shared storage through a path designated by said instruction, and starts the newly-loaded specified program according to designated collection program execution information included in said instruction.

5. The information management sub-system, as described in claim 4, wherein said sub-manager is configured to instruct a particular agent to execute an arbitrary one of said programs stored in said shared storage targeting on arbitrary information, enabling the particular agent to store a result of analysis or observation of said arbitrary information into the shared storage managed by said sub-manager.

6. An information management method for managing information in an information management system, having: a first network for communication; a first management computer connected with said first network; a business computer connected with said first network; and a second management computer connected with said first network and also connected with a separate shared storage for storing information through a second network for communication separate from said first network, said business computer also being connected to said separate shared storage via said second network, the method comprising the following steps of:

operating on said first management computer a manager for managing management targets in the system;

operating on said business computer a plurality of agents for executing collection and analysis of information data collected on one or more of said management targets; and operating on said second management computer a sub-manager for managing said agents under control of said manager, storing the information data collected on said management targets by said agents in a collection partition in the shared storage, wherein the information data stored in said shared storage area is shared between said sub-manager and said agents through said second network, wherein said shared storage includes a program partition for storing programs accessed and used by said agents for collecting and analyzing said information data, said programs in the shared storage being managed by said sub-manager integrally managing the plurality of agents by said sub-manage, via the shared storage, such that when said agents store the information data in the shared storage, the information data is controlled by the sub-manager, and such that loading of programs to be executed within each agent for obtaining the information data is managed within the shared storage by the sub-manager, in response to an instruction supplied from the sub-manager, reading out by the agents from the shared storage a specified program for collection of the information data, execution of the specified program by the agents, and storage of a result in the shared storage by the agents;

initiating an execution process by said manager by specifying the sub-manager corresponding to one or more of said agents, and sending program management information to the sub-manager with the specified program name;

receiving the program management information by said sub-manager from said manager and determining which agents managed by the sub-manager correspond to the program management information;

allocating by said sub-manager a new collection data partition in the shared storage managed by the sub-manager for use for the information data storage, producing collection program execution information, and sending the instruction for the specified program execution to each corresponding agent, and receiving by each corresponding agent the instruction from said sub-manager, stopping by each corresponding agent any collection program already under execution, loading by each corresponding agent the specified program from the shared storage through a path designated by said instruction; and starting by each corresponding agent the newly-loaded specified program according to designated collection program execution information included in said instruction.

7. The information management method, as described in the claim 6, further including the step of instructing, by said sub-manager, a particular agent to execute an arbitrary one of said programs stored in said shared storage targeting on arbitrary information, enabling the particular agent to store a result of analysis or observation of said arbitrary information into the shared storage managed by said sub-manager.

8. The information management method, as described in the claim 6, wherein said manager selects all or part of analysis data generated by said programs stored in said shared storage and executed by said agents or said sub-manager, said analysis data being stored within an analysis partition in said shared storage, so as to enable said manager to observe or re-analyze said analysis data.

9. An information management system, comprising:
a first network for communication, said first network being a local area network or a wide area network;
a first management computer connected with said first network
a manager operating on said first management computer for managing; management targets in the system;
a business computer connected with said first network;
a plurality of agents operating on said business computer for executing collection and analysis of information data collected on one or more of said management targets;
a second management computer connected with said first network and also connected with a second network, said second network being a storage area network enabling communication separate from said first network;
a shared storage for storing information, said shared storage being connected to said second management computer through said second network, said shared storage further being connected to said business computer through said second network, wherein said shared storage is separate from said second management computer and said business computer, and able to communicate with said second management computer and said business computer through said second network; and a sub-manager operating on said second management computer for managing said agents under control of said manager, wherein the information data collected on said management targets by said agents is stored in a collection data partition in the shared storage, wherein said sub-manager shares in common with said agents through said second network the information data stored in said shared storage, wherein said shared storage includes a program partition for storing programs accessed and used by said agents for collecting and analyzing said information data, said programs in the shared storage being managed by said sub-manager, wherein said sub-manager is configured to integrate management of the plurality of agents via the shared storage, such that when said agents store the information data in the shared storage, the information data is controlled by the sub-manager, and such that loading of programs to be executed within each agent for obtaining the information data is managed within the shared storage by the sub-manager, wherein, in response to an instruction supplied from the sub-manager, the agents are configured to read out from the shared storage a specified program for collection of the information data, execute the specified program, and store a result in the shared storage, wherein said manager is configured to initiate an execution process by specifying the sub-manager corresponding to one or more of said agents, and sending program management information to the sub-manager with the specified program name, wherein said sub-manager is configured to receive the program management information from said manager and determine which agents managed by the sub-manager correspond to the program management information, wherein said sub-manager allocates a collection data partition in the shared storage managed by the sub-manager for use for collection data storage, produces collection program execution information, and sends the instruction for collection program execution to each corresponding agent, and wherein each corresponding agent receives the instruction from said sub-manager, stops any collection program already under execution by the agent, loads the specified program from the shared storage through a path designated by said instruction, and starts the newly-loaded specified program according to designated collection program execution information included in said instruction.

10. The information management system according to claim 1, further comprising:

said first network is a local area network or a wide area network; and said second network is a storage area network.

11. The information management sub-system according to claim 4, further comprising:

said first network is a local area network or a wide area network; and said second network is a storage area network.

12. The information management method according to claim 6, further comprising:

providing said first network separate from said second network, wherein said first network is a local area network or a wide area network, and said second network is a storage area network.

* * * * *